(12) United States Patent
Zak et al.

(10) Patent No.: US 12,465,440 B1
(45) Date of Patent: Nov. 11, 2025

(54) GUIDED INJECTION FOR LOCAL ANESTHESIA

(71) Applicant: Mars Dental AI Ltd., Kiriyat Tivon (IL)

(72) Inventors: Eyal Tsvi Zak, Kibbutz Megiddo (IL); Ariel Shusterman, Kiriyat Tivon (IL)

(73) Assignee: Mars Dental AI Ltd., Kiriyat Tivon (IL)

( * ) Notice: Subject to any disclaimer, the term of this patent is extended or adjusted under 35 U.S.C. 154(b) by 0 days.

(21) Appl. No.: 19/199,435

(22) Filed: May 6, 2025

Related U.S. Application Data

(63) Continuation-in-part of application No. 18/918,182, filed on Oct. 17, 2024, which is a continuation of
(Continued)

(51) Int. Cl.
*A61B 34/00* (2016.01)
*A61B 34/10* (2016.01)
(Continued)

(52) U.S. Cl.
CPC .............. *A61B 34/25* (2016.02); *A61B 34/10* (2016.02); *A61B 90/37* (2016.02); *A61C 13/34* (2013.01);
(Continued)

(58) Field of Classification Search
CPC ......... A61B 34/25; A61B 34/20; A61B 90/37; A61B 34/10; A61B 2090/365;
(Continued)

(56) References Cited

U.S. PATENT DOCUMENTS 5,688,118 A 11/1997 Hayka et al.
7,367,801 B2 5/2008 Saliger
(Continued)

FOREIGN PATENT DOCUMENTS

WO WO 2022/190105 9/2022

OTHER PUBLICATIONS

Notice of Allowance Dated Jul. 23, 2024 From the US Patent and Trademark Office Re. U.S. Appl. No. 18/656,633. (10 Pages).
(Continued)

*Primary Examiner* — Vinh T Lam

(57) ABSTRACT

There is provided a method comprising: detecting and/or segmenting a dental-related anatomical structure of a subject from a dental 3D imaging model, wherein the dental-related anatomical structure includes a target for injection of anesthesia by a dental syringe, accessing sequential frames of an oral cavity of a subject captured by an image sensor during a dental session of the subject, presenting within a GUI, at least one fused frame depicting a merger of the sequential frames and the segmentation of the dental-related anatomical structure of the subject registered to the sequential frames, wherein the dental-related anatomical structure is depicted on the sequential frames at a location indicating the target for injection, and dynamically updating the location of the dental-related anatomical structure depicted on the sequential frames according to dynamic adaptation of a pose of the image sensor.

22 Claims, 16 Drawing Sheets

Related U.S. Application Data application No. 18/656,633, filed on May 7, 2024, now Pat. No. 12,220,185, and a continuation-in-part of application No. 18/656,634, filed on May 7, 2024, now Pat. No. 12,213,751.

(51) Int. Cl.
*A61B 90/00* (2016.01)
*A61C 13/34* (2006.01)
*G06T 19/00* (2011.01)

(52) U.S. Cl.
CPC ...... *G06T 19/006* (2013.01); *A61B 2034/102* (2016.02); *A61B 2034/105* (2016.02); *A61B 2090/365* (2016.02); *G06T 2200/24* (2013.01); *G06T 2210/41* (2013.01)

(58) Field of Classification Search
CPC ........ A61B 2034/105; A61B 2090/371; A61B 2034/102; A61B 2090/372; A61B 2034/107; A61B 2034/2048; A61C 1/084; A61C 13/34; G06T 19/006; G06T 2219/004; G06T 2210/41; G06T 2200/24
See application file for complete search history.

(56) References Cited

U.S. PATENT DOCUMENTS

| | | | |
|---|---|---|---|
| 7,457,443 | B2 | 11/2008 | Persky |
| 10,022,202 | B2 * | 7/2018 | Colby ................. A61C 5/42 |
| 10,064,700 | B2 * | 9/2018 | Fudim .................. A61C 1/082 |
| 10,888,399 | B2 * | 1/2021 | Kopelman ............. A61B 90/36 |
| 11,051,914 | B2 | 7/2021 | Kopelman et al. |
| 11,160,639 | B2 * | 11/2021 | Palmer .................... A61B 6/51 |
| 11,357,576 | B2 | 6/2022 | Jo et al. |
| 11,399,915 | B2 | 8/2022 | Colby |
| 11,510,638 | B2 | 11/2022 | Merritt |
| 11,553,969 | B1 | 1/2023 | Lang et al. |
| 11,559,377 | B2 | 1/2023 | Kopelman |
| 11,594,002 | B2 | 2/2023 | Coustaud et al. |
| 11,684,374 | B2 | 6/2023 | Kang et al. |
| 11,711,596 | B2 * | 7/2023 | Lennartz ............. A61B 90/361 348/74 |
| 11,727,581 | B2 | 8/2023 | Lang |
| 11,730,564 | B2 | 8/2023 | Colby |
| 11,751,944 | B2 | 9/2023 | Lang |
| 11,771,533 | B2 | 10/2023 | Senn et al. |
| 11,931,114 | B2 | 3/2024 | Qian et al. |
| 11,978,203 | B2 | 5/2024 | Kim et al. |
| 12,053,247 | B1 | 8/2024 | Chiou |
| 12,263,049 | B2 * | 4/2025 | Kopelman ............. A61C 13/34 |
| 2011/0045432 | A1 | 2/2011 | Groscurth et al. |
| 2013/0172731 | A1 | 7/2013 | Gole |
| 2013/0302752 | A1 | 11/2013 | Schneider |
| 2013/0309628 | A1 | 11/2013 | Orth et al. |
| 2014/0186794 | A1 | 7/2014 | Deichmann et al. |
| 2014/0227656 | A1 * | 8/2014 | Fudim .................... A61C 1/082 433/29 |
| 2014/0272773 | A1 | 9/2014 | Merritt et al. |
| 2015/0150655 | A1 | 6/2015 | Frank et al. |
| 2015/0296184 | A1 | 10/2015 | Lindenbert et al. |
| 2016/0135904 | A1 | 5/2016 | Daon |
| 2016/0235481 | A1 | 8/2016 | Dorman |
| 2018/0008355 | A1 | 1/2018 | Mozes et al. |
| 2018/0168781 | A1 | 6/2018 | Kopelman et al. |
| 2019/0038367 | A1 | 2/2019 | Ciriello et al. |
| 2019/0223957 | A1 | 7/2019 | Dekel et al. |
| 2019/0269482 | A1 | 9/2019 | Shanjani et al. |
| 2019/0350680 | A1 | 11/2019 | Chekh et al. |
| 2020/0008877 | A1 | 1/2020 | Jo et al. |
| 2020/0138518 | A1 | 5/2020 | Lang |
| 2021/0161626 | A1 | 6/2021 | Kim et al. |
| 2021/0186454 | A1 | 6/2021 | Behzadi et al. |
| 2021/0192759 | A1 | 6/2021 | Lang |
| 2022/0015875 | A1 | 1/2022 | Palmer |
| 2022/0047278 | A1 | 2/2022 | Fitz et al. |
| 2022/0084267 | A1 * | 3/2022 | Ezhov .................. A61B 6/4085 |
| 2022/0241018 | A1 | 8/2022 | Dorman |
| 2022/0257332 | A1 | 8/2022 | Duong |
| 2022/0287676 | A1 | 9/2022 | Steines et al. |
| 2022/0361992 | A1 | 11/2022 | Ezhov et al. |
| 2022/0409295 | A1 | 12/2022 | Carrat et al. |
| 2023/0252748 | A1 * | 8/2023 | Ezhov .................. A61B 6/4085 |
| 2023/0298272 | A1 * | 9/2023 | Ezhov .................. A61C 9/0053 345/423 |
| 2023/0414318 | A1 | 12/2023 | Colby |
| 2023/0419631 | A1 * | 12/2023 | Ezhov .................... G16H 50/20 |
| 2024/0041530 | A1 | 2/2024 | Lang |
| 2024/0046490 | A1 | 2/2024 | Lang |
| 2024/0148469 | A1 | 5/2024 | Colby |

OTHER PUBLICATIONS

Notice of Allowance Dated Sep. 30, 2024 from the US Patent and Trademark Office Re. U.S. Appl. No. 18/656,634. (7 Pages).

Official Action Dated Jul. 12, 2024 From the US Patent and Trademark Office Re. U.S. Appl. No. 18/656,634. (27 Pages).

Second Notice of Allowance Dated Oct. 16, 2024 together with Interview Summary From the US Patent and Trademark Office Re. U.S. Appl. No. 18/656,633. (18 Pages).

Eid et al. "A Custom Haptic Syringe to Improve a VR Local Anesthesia Simulation for Foundational Dental Education: A Feasibility Study", Open Journal of Applied Sciences, 14(12): 3460-3479, Published Online Dec. 10, 2024.

Gimenez Corrêa et al. "Virtual Reality Simulator for Dental Anesthesia Training in the Inferior Alveolar Nerve Block", Journal of Applied Oral Science: Revista FOB, 25(4): 357-366, Jul.-Aug. 2017.

Mladenovic et al. "Augmented Reality Technology as A Method of Distance Learning for Local Anesthesia Training", Journal of Dental Education, 85(Suppl.3): 2038-240, Published Online Mar. 2, 2021.

Mladenovic et al. "Effect of Augmented Reality Simulation on Administration of Local Anaesthesia in Paediatric Patients", European Journal of Dental Education, 24(3): 507-512, Published Online Apr. 13, 2020.

Radpedia "AR Pucture: Medical AR Viewer", Radpedia, Apps on Google Play, 3 P., Updated Aug. 22, 2023.

Won et al. "Application of Augmented Reality for Inferior Alveolar Nerve Block Anesthesia: A Technical Note", Journal of Dental Anesthesia and Pain Medicine, 17(2): 129-134, Published Online Jun. 29, 2017.

European Search Report and the European Search Opinion Dated Sep. 8, 2025 From the European Patent Office Re. Application No. 25174505.5. (7 Pages).

* cited by examiner

GUIDED INJECTION FOR LOCAL ANESTHESIA

RELATED APPLICATIONS

This application is a Continuation-in-Part (CIP) of U.S. patent application Ser. No. 18/918,182 filed on Oct. 17, 2024, which is a Continuation of U.S. patent application Ser. No. 18/656,633 filed on May 7, 2024, now U.S. Pat. No. 12,220,185.

This application is also a Continuation-in-Part (CIP) of U.S. patent application Ser. No. 18/656,634 filed on May 7, 2024, now U.S. Pat. No. 12,213,751.

This application is also related to PCT Patent Application No. PCT/IL2022/050274 having International filing date of Mar. 10, 2022.

The contents of the above applications are all incorporated by reference as if fully set forth herein in their entirety.

BACKGROUND

The present invention, in some embodiments thereof, relates to user interfaces and, more specifically, but not exclusively, to a user interface for use during a dental procedure.

User interface technologies have dramatically evolved in recent times and have spread to numerous applications, uses and practices. Among other applications, the use of user interfaces to support dental procedures has also dramatically increased, in particular for more complex dental procedures such as, for example, dental surgery, dental implants and/or the like.

SUMMARY

According to a first aspect, a computer implemented method for processing data using at least one processor coupled to a memory, comprises: displaying via a display device of a client computing device, an interactive graphical user interface (GUI) for planning positioning of a dental syringe in a subject: presenting, within the GUI, sequential frames of an oral cavity of a subject captured by at least one image sensor during a dental session of the subject, computing a real-world location and/or angle of a real-world dental syringe manipulated by a user, and dynamically updating, within the GUI, an overlay of a virtual angle and/or virtual location of a virtual vector overlaid on the sequential frames corresponding to the real-world location and/or angle of the real-world dental syringe, wherein the virtual vector denotes a location and angle for injection of an anesthetic agent by a needle of the dental syringe.

In a further implementation form of the first aspect, further comprising: detecting and/or segmenting at least one dental-related anatomical structure of the subject from a dental 3D imaging model, wherein the at least one dental-related anatomical structure includes at least one target for injection of anesthesia by the dental syringe, presenting within the GUI, at least one fused frame depicting a merger of the sequential frames and the segmentation of the at least one dental-related anatomical structure of the subject registered to the sequential frames, wherein the at least one dental-related anatomical structure is depicted on the sequential frames at a location indicating the at least one target for injection, and dynamically updating the location of the at least one dental-related anatomical structure depicted in the at least one fused frame according to dynamic adaptation of a pose of the at least one image sensor.

In a further implementation form of the first aspect, further comprising presenting within the GUI, an overlay comprising a target virtual vector positioned at the location indicating a target angle for placement of the needle for injection of an anesthetic agent at the at least one dental-related anatomical structure.

In a further implementation form of the first aspect, the target angle is computed from the dental 3D imaging model by feeding at least a portion of the dental 3D imaging model into a machine learning model trained on a plurality of sample dental 3D imaging models of a plurality of sample patients, each sample dental 3D imaging model labelled with a ground truth label of the target angle positioned at the location corresponding to the at least one dental-related anatomical structure.

In a further implementation form of the first aspect, the target virtual vector is fixed with respect to the location of the at least one dental-related anatomical structure and depicted in the at least one fused frame during the dynamic adaptation of the pose of the at least one image sensor.

In a further implementation form of the first aspect, the at least one dental-related anatomical structure is selected from: mental foramen and mandibular foramen.

In a further implementation form of the first aspect, further comprising dynamically updating within the GUI, the virtual vector depicted at least partially within the segmentation of the at least one dental-related anatomical structure according to manipulations of the dental syringe by the user.

In a further implementation form of the first aspect, the at least one dental-related anatomical structure comprises a plurality of different dental-related anatomical structures selected from: roots of teeth, jawbone, at least one nerve, and at least one foramen, wherein the plurality of different dental-related anatomical structures are simultaneously presented within the GUI.

In a further implementation form of the first aspect, further comprising dynamically generating and presenting within the GUI, a second overlay over the sequential frames of a virtual angle and/or virtual location of a visual indication of a predicted region of anesthetized tissue, according to an injection of anesthesia at a corresponding physical angle and/or physical location of the dental syringe manipulated by the user.

In a further implementation form of the first aspect, further comprising presenting within the GUI, a dental 3D visual model of the subject created based on a visible light spectrum intraoral scan of the subject, the dental 3D visual model presented as a second overlay on the sequential frames according to a registration between the dental 3D visual model, the dental 3D imaging model, and the sequential frames, wherein the target virtual vector is overlaid on the dental 3D visual model and the sequential frames and placed at the location denoting the at least one dental-related anatomical structured at the target angle for placement of the needle for injection of the anesthetic agent, wherein the dental 3D visual model is created by an intraoral scanner capturing images at the visual light spectrum.

According to a second aspect, a computer-implemented method for processing data using at least one processor coupled to a memory, comprises: displaying via a display unit of a client computing device, an interactive graphical user interface (GUI) for guiding positioning of a dental syringe in a subject, presenting within the GUI, a first overlay of a target virtual vector overlaid on at least one image of an oral cavity of a subject captured by at least one image sensor during a dental session of the subject, wherein the target virtual vector denotes a target virtual vector defining a target location and a target angle for injection of an anesthetic agent by a real-world needle of a real-world syringe, monitoring a real-world location and angle of the real-world needle of the dental syringe during manipulations by a user, and dynamically updating, within the GUI, a second overlay of a current virtual vector overlaid on the at least one image including the first overlay, the current virtual vector including a virtual location and virtual angle corresponding to a current value of the monitored real-world location and angle of the real-world needle of the dental syringe, wherein the current virtual vector is presented as a first line parallel to a long axis of the needle and as a plurality of first concentric circles arranged along a first plane, the first line is normal to the first plane, the target virtual vector is presented as a second line parallel to a direction for insertion of the needle and as a plurality of second concentric circles arranged along a second plane, the second line is normal to the second plane, wherein when misaligned the plurality of first concentric circles and the plurality of second concentric circles are distinct and dynamically visually adapted for indicting direction and/or amount and/or angle for alignment, and when aligned are depicted as a single set of concentric circles.

In a further implementation form of the second aspect, the target location is selected from: mental foramen and mandibular foramen.

In a further implementation form of the second aspect, further comprising dynamically tracking a misalignment between the current virtual vector and the target virtual vector, and presenting within the GUI, an indication of the misalignment, wherein the indication for reducing the misalignment is for adapting at least one of: spatial coordinates of the current virtual vector to match the spatial coordinates of the target virtual vector, the angle of the current virtual vector to substantially match the angle of the target virtual vector, and a depth of the current virtual vector corresponding to a tip of the dental syringe relative to an initial location for injection defined by the target virtual vector.

In a further implementation form of the second aspect, a center of the plurality of first concentric circles and a center of the first line correspond to a tip of the needle, wherein a center of the plurality of second concentric circles corresponds to an initial location for injection, wherein a center of the second line corresponds to the initial location for injection, wherein a first portion of the second line below the center is depicted within tissue and a second portion of the second line above the center is depicted external to the tissue.

According to a third aspect, a computer implemented method for processing data using at least one processor coupled to a memory, comprises: detecting and/or segmenting at least one dental-related anatomical structure of the subject from a dental 3D imaging model, wherein the at least one dental-related anatomical structure includes at least one target for injection of anesthesia by a dental syringe, displaying via a display device of a client computing device, an interactive graphical user interface (GUI) for planning positioning of a dental syringe in a subject: accessing sequential frames of an oral cavity of a subject captured by at least one image sensor during a dental session of the subject, presenting within the GUI, at least one fused frame depicting a merger of the sequential frames and the segmentation of the at least one dental-related anatomical structure of the subject registered to the sequential frames, wherein the at least one dental-related anatomical structure is depicted on the sequential frames at a location indicating the at least one target for injection, and dynamically updating the location of the at least one dental-related anatomical structure depicted on the sequential frames according to dynamic adaptation of a pose of the at least one image sensor.

In a further implementation form of the third aspect, the location of the at least one dental-related anatomical structure is dynamically updated independently of a pose of the dental syringe.

In a further implementation form of the third aspect, further comprising presenting within the GUI, an overlay comprising a target virtual vector positioned at the location indicating a target angle for placement of a needle of the dental syringe for injection of an anesthetic agent at the at least one dental-related anatomical structure.

In a further implementation form of the third aspect, the target angle is computed from the dental 3D imaging model by feeding at least a portion of the dental 3D imaging model into a machine learning model trained on a plurality of sample dental 3D imaging models of a plurality of sample patients, each sample dental 3D imaging model labelled with a ground truth label of the target angle positioned at the location corresponding to the at least one dental-related anatomical structure.

In a further implementation form of the third aspect, the target virtual vector is fixed with respect to the location of the at least one dental-related anatomical structure and depicted in the at least one fused frame during the dynamic adaptation of the pose of the at least one image sensor.

In a further implementation form of the third aspect, the target virtual vector is adaptable via a user interface, and fixed at the target angle in response to a user input entered via the user interface.

In a further implementation form of the third aspect, the target virtual vector is presented as a line parallel to a direction for insertion of the needle and as a plurality of concentric circles arranged along a plane tangent to a surface of the location of the at least one dental-related anatomical structure, wherein the line is normal to the plane.

In a further implementation form of the third aspect, the at least one dental-related anatomical structure is selected from: mental foramen and mandibular foramen.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
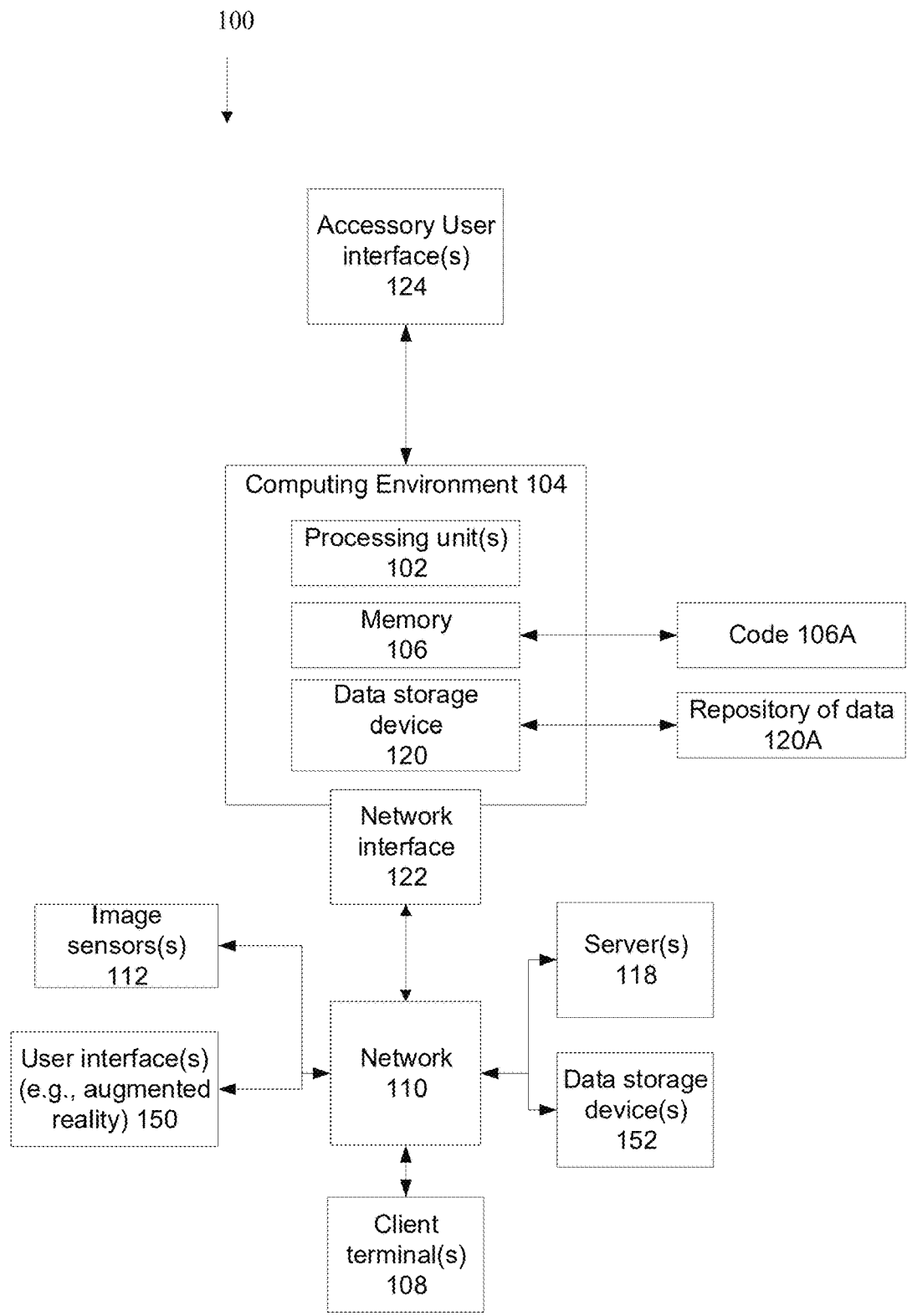
FIG. 1 is a block diagram of a system for generating and/or updating a GUI for planning positioning of a dental syringe and/or a dental implant in a subject, in accordance with some embodiments of the present invention.

The present invention, in some embodiments thereof, relates to user interfaces and, more specifically, but not exclusively, to a user interface for use during a dental procedure.

An aspect of some embodiments of the present invention relates to systems, methods, computing devices, and/or code instructions (stored on a data storage device and executable by one or more processors) for generating and/or updating a user interface, optionally a graphical user interface (GUI) for guiding injection of an anesthetic agent into an oral cavity of a subject using a dental syringe (e.g., a needle of the dental syringe). For example, for administering the anesthetic agent into the mental foramen and/or the mandibular foramen during a dental procedure. One or more dental-related anatomical structure of the subject are segmented from a dental 3D imaging model and/or detected on the dental 3D imaging model. For example, a segmentation model is used to segment a foramen (e.g., mental and/or mandibular) a pre-procedure CT scan, and/or a detector model is used to detect the foramen on the pre-procedure CT scan. The dental-related anatomical structure(s) include one or more targets for injection of anesthesia by the dental syringe, optionally the mental foramen and/or mandibular foramen. Sequential frames of an oral cavity of a subject captured by an image sensor(s) during a dental session of the subject are accessed. One or more fused frame depicting a merger of the sequential frames and the segmentation of the dental-related anatomical structure(s) of the subject registered to the sequential frames, are generated and presented within the GUI. The dental-related anatomical structure(s) is depicted on the sequential frames at a location indicating the target for injection. The dental-related anatomical structure(s) may be visually indicated on the fused frame(s), for example, color coded, marked with an overlaid visual icon (e.g., dot), generating an arrow pointing to the dental-related anatomical structure(s), and the like. The location of the dental-related anatomical structure depicted on the sequential frames is dynamically updated according to dynamic adaptation of a pose of the image sensor(s). For example, the image sensor(s) (e.g., camera) is located on a virtual reality headset worn by the dentist. The visual indication indicating location of the foramen (i.e., the dental-related anatomical structure) is dynamically updated on the fused image as the dentist moves their head, for continuously maintaining the dentist's ability to visualize the location from different poses.

The location of the dental-related anatomical structure may be dynamically presented and/or updated independently of a pose of the dental syringe.

Optionally, an overlay of a target virtual vector positioned at the location is presented within the GUI. The target visual vector indicates a target angle for placement of the needle for injection of an anesthetic agent at the dental-related anatomical structure. The dentist may align the needle along the target visual vector for injection into the dental-related anatomical structure. The pose of the target virtual vector may be fixed with respect to the location of the dental-related anatomical structure, such that the target virtual vector is continuously depicted in the fused frame(s) during the dynamic adaptation of the pose of the image sensor. For example, when image sensor(s) (e.g., camera) is located on a virtual reality headset worn by the dentist, the corresponding view of the target virtual vector is dynamically updated according to the dentist's head movements, for continuously maintaining the dentist's ability to visualize the location from different poses.

The target virtual vector presented in the fused frames may be selected based on a dental 3D imaging model that includes the dental-related anatomical structure, for example, a pre-procedure CT scan of a jawbone of the subject that includes the mental foramen and/or mandibular foramen. The selected target virtual vector is registered with the sequential frames and presented in the fused frames. Different approaches may be used for defining the target virtual vector. In one example, a user manually marks the target virtual vector on the CT scan. The user may user a user interface to adapt the pose of the target virtual vector, and to fix the target angle and/or target location of the target virtual vector by providing input into the user interface (e.g., pressing a button). In another example, the target angle and/or target location of the target virtual vector is automatically computed from the dental 3D imaging model. For target virtual vector may represent an optimal angle for injection of the anesthetic agent into the dental-related anatomical structure, for example, minimum thickness of tissue over the dental-related anatomical structure, best exposure, easiest angle at which to hold the needle, and the like. The target virtual vector is automatically computed from the dental 3D imaging model, for example, using a set of rules, and/or by feeding at least a portion of the dental 3D imaging model into a machine learning model. The machine learning model may be trained on sample dental 3D imaging models of sample patients, each sample dental 3D imaging model labelled with a ground truth label of the target angle positioned at the location corresponding to the dental-related anatomical structure. The ground truth label may be selected, for example, by a domain expert such as a dentist.

At least one embodiment described herein addresses the technical problem of improving simplicity of a GUI for assisting a user in injecting an anesthetic agent into an oral cavity of a subject. At least one embodiment described herein improves the technology of GUI, by improving simplicity of a GUI for assisting a user in injecting an anesthetic agent into an oral cavity of a subject. At least one embodiment described herein improves upon prior GUIs and/or prior guidance systems, by improving simplicity of a GUI for assisting a user in injecting an anesthetic agent into an oral cavity of a subject. At least one embodiment described herein solves the aforementioned technical problem, and/or improves the aforementioned technical field, and/or improves upon the aforementioned prior approaches, and/or provides the practical application of, providing a GUI depicting fused frames, creating by merging sequential frames of an oral cavity of a subject captured by a camera and a detected and/or segmented dental-related anatomical structure indicating a target for injection of anesthesia by a dental syringe, for example, a mandibular foramen and/or mental foramen. The dental-related anatomical structure is detected on and/or segmented from a dental 3D imaging model, such as of a jawbone, optionally obtained from a pre-procedure CT scan. The location of the dental-related anatomical structure is continuously and dynamically presented according to dynamic adaptation of a pose of the camera. For example, when the camera is located on a virtual reality headset worn by the dentist, the corresponding location of the dental-related anatomical structure is dynamically updated according to the dentist's head movements, for continuously maintaining the dentist's ability to visualize the location from different poses. The dentist may then inject the anesthetic agent into the dental-related anatomical structure. The tracking and/or the indication of the location of the dental-related anatomical structure may be performed independently of any tracking and/or monitoring of the needle. No tracking and/or monitoring of the needle is required. The dentist may freely manipulate the needle as desired, for injection into the visually indicated location of the dental-related anatomical structure.

An aspect of some embodiments of the present invention relates to systems, methods, computing devices, and/or code instructions (stored on a data storage device and executable by one or more processors) for generating and/or updating a user interface, optionally a graphical user interface (GUI) for planning positioning of a dental syringe (e.g., a needle of the dental syringe) and/or a dental implant in a subject, for example, for administering an anesthetic agent into the mental foramen and/or the mandibular foramen during a dental procedure. The GUI may be presented within an augmented reality (AR) device worn by a user (e.g., dentist), and/or presented on a display such as for viewing by an assistant to the user (e.g., dental assistant). Sequential frames of an oral cavity of a subject are accessed. The sequential frames are captured by one or more image sensors, such as a camera, optionally installed on the AR device. The sequential frames may be captured during a dental session of the subject during which local anesthesia is being administered via injection. The sequential frames may be presented within the GUI. A processor(s) computes a real-world location and/or a real-world angle of a real-world tool manipulated by a user. The real-world tool may be a dental syringe with needle used by the user for local injection of anesthesia in the jaw of the subject as part of a dental procedure. Alternatively or additionally, the real-world tool may be a drill with a bur used by the user for drilling in the jaw of the subject for insertion of the dental implant. A virtual vector for presentation of the GUI, is defined by a virtual location and/or virtual angle corresponds to the computed real-world location and/or real-world angle, such that manipulations of the tool (e.g., dental syringe) by the user dynamically update the virtual vector accordingly. The virtual vector indicates a location and angle for injection of anesthesia by the needle of the dental syringe. Alternatively or additionally, the virtual vector indicates a location and angle for drilling by the bur of the drill for implanting the dental implant. An overlay of the virtual angle and/or virtual location of the virtual vector over the sequential frames within the GUI is dynamically updated in response to manipulations by the user and/or in response to changes in pose of the camera(s) (e.g., due to head movements by the user wearing the AR device).

Optionally, one or more other visual elements are presented as overlays over the sequential frames within the GUI, and are dynamically updated. The other visual elements may be presented simultaneously with the virtual vector, optionally intersecting the virtual vector. Examples of other visual elements include: dental-related anatomical structures of the subject (e.g., jaw bone, one or more nerves, roots of teeth, mental foramen, and/or mandibular foramen), alerts such as distance between the virtual vector and dental-related anatomical structures is below a threshold, 3D virtual model of the dental implant, and a dental 3D visual model.

An aspect of some embodiments of the present invention relates to systems, methods, computing devices, and/or code instructions (stored on a data storage device and executable by one or more processors) for generating and/or updating a user interface, optionally a graphical user interface (GUI) for guiding injection of an anesthetic agent via a dental syringe and/or drilling and/or positioning of a dental implant in a subject, for example, for a dental prosthesis such as a crown. The GUI may be presented within an augmented reality (AR) device worn by a user (e.g., dentist), and/or presented on a display such as for viewing by an assistant to the user (e.g., dental assistant). Sequential frames of an oral cavity of a subject are accessed. The sequential frames are captured by one or more image sensors, such as a camera, optionally installed on the AR device. The sequential frames may be captured during a dental session of the subject for injection of the anesthetic agent and/or for insertion of the dental implant. A target vector is presented over the frames within the GUI, optionally as an overlay. The target virtual vector includes a target vector defining a target location and/or a target angle for injection of the anesthetic agent by a real-world needle of a real-world syringe and/or for drilling by a real-world bur of a real-world drill for insertion of the dental implant. A real-world location and/or real-world angle of the real-world needle of the dental syringe and/or of the real-world bur of the drill is computed during manipulations by a user (e.g., dentist performing the injection and/or the implant procedure). A current virtual vector including a virtual location and/or virtual angle is computed. The current virtual vector corresponds to the real-world location and/or the real-world angle of the real-world needle and/or bur. The current virtual vector is dynamically adapted in response to manipulations of the dental syringe and/or drill by the user. The current virtual vector is presented over the frames, optionally within the overlay or as a second overlay. The current virtual vector may be simultaneously presented with the target virtual vector. The user may use the current virtual vector presented in the GUI to guide real-world manipulations of the syringe for injection at the target virtual vector and/or of the drill for drilling at the target virtual vector.

In implementations for injection using the dental syringe, the target virtual vector represents the target location for injection, for example, mental foramen and/or mandibular foramen.

Optionally, an indication of a misalignment between the current virtual vector and the target virtual vector is monitored and/or dynamically computed, and presented within the GUI. Alternatively or additionally, an indication for reducing the misalignment for obtaining an alignment between the current virtual vector and the target virtual vector may be presented within the GUI. The user may use the indication of misalignment and/or the indication for reducing the misalignment to manipulate the dental syringe to position the needle and/or to manipulate the drill to position the bur, at the physical location within the mouth of the subject corresponding to the target virtual vector.

At least one embodiment described herein addresses the technical problem of providing tools for planning and/or guiding a dental syringe for injection of anesthesia in an oral cavity of a subject, for example, into the mental foramen and/or mandibular foramen. At least one embodiment described herein improves the technical field of image-assistant guidance, by providing tools for planning and/or guiding a dental syringe for injection of anesthesia in an oral cavity of a subject. At least one embodiment described herein improves upon prior approaches of planning and/or guiding a dental syringe for injection of anesthesia in an oral cavity of a subject. At least one embodiment described herein provides the practical application of tools for planning and/or guiding a dental syringe for injection of anesthesia in an oral cavity of a subject.

In order to locally numb the oral cavity, the dentist performs local anesthesia. In order to perform the local anesthesia, the dentist injects in specific places using anatomical landmarks that are "hidden" under the soft tissue, for example: the mental foramen and mandibular foramen in the lower jaw. The mandibular foramen and/or mental foramen are examples of sites that the dentist may inject near their entrances to provide local anesthesia for a dental procedure. The mandibular foramen and/or mental foramen and hidden under the soft tissue and their exact position is difficult to deduce, making it difficult to correctly administer the local anesthesia. One example of common practice is an iterative "trial and error", in which the dentist injects a couple of times to the area of the desired position, waits until the relevant area should be numb, if it is not numb or not enough, the dentist repeats this procedure. Usually the dentist injects anesthesia redundantly several times, which causes unneeded pain to the patient, extends the duration of the procedure, and/or uses unneeded anesthesia.

At least one embodiment described herein addresses the aforementioned technical problem, and/or improves upon the aforementioned existing approaches, and/or improves upon the aforementioned technical field, by registering the patient's jaw to a guidance system in real time. Anatomical landmarks which include internal anatomical features below a surface of tissue (e.g., nerve, mental foramen, mandibular foramen) may be identified and/or marked. The anatomical landmarks may be obtained, for example, from another anatomical imaging modality, for example, a CT scanner and/or MRI machine. The anatomical landmarks in the anatomy originating from the same input anatomical imaging data are defined as being in the same coordinate system. A pose of the anatomical landmarks and/or oral cavity (e.g., jaw, jaw bone) may be registered to the guidance system, for example, to a coordinate system of a camera. An image, optionally a fusion of image captured by the camera and the anatomical landmarks obtained from the anatomical imaging modality, may be generated and/or projected, for example, on a display and/or within an artificial reality device such as virtual reality glasses. The fused image may be dynamically updated in real time, as the user manipulates the dental syringe, such as moving the dental syringe to a target location (e.g., anatomical landmark). The fused image enables the user (e.g., dentist) to more accurately guide the dental syringe to the target location via visual navigation to the anatomical landmarks presented over images of the subject's oral cavity, in contrast for example to simply guessing the location of the target location. For example, the pose of the foramen(s) are presented, in real time, on images of the patient's oral cavity, which helps the user (e.g., dentist) determine the position of the target location for injection of the anesthesia in freehand instead of "predicting the position", for example, by the looks of the soft tissue and touching the bone through the soft tissue in order to understand the position of the foramen.

At least one embodiment described herein provides guidance for maneuvering the dental syringe without tracking and/or calculating the position of the dental syringe, by calculating the pose of at least one anatomical structure (e.g., jaw) which includes one or more anatomical landmarks (e.g., mental foramen, mandibular foramen). Calculating pose of at least one anatomical structure and/or anatomical landmark of the subject (e.g., jaw) and pose of the dental syringe, enables computing a distance and/or pose between the anatomical structure (and/or anatomical landmark) and the dental syringe. The relative poses enables presenting a real-time location of the anatomical landmarks relative to the dental syringe, for example, a display and/or visual an artificial reality device. Incorporating the 3D knowledge of the position of the anatomical landmark to be close to the bone with 2D guidance, allows to 3D guide the dental syringe to the anatomical landmark (e.g., foramen). In contrast, using standard manual approaches, the dentist is aware of the general location of the foramen(s) which is inaccurate for insertion of the needle of the dental syringe.

In the case of small anatomical landmarks, for example, the foramen(s), the accuracy of the location of the small anatomical landmarks provided by at least one embodiment described herein may be sufficient for accurate injection. For example, the foramen(s) is identified and presented as an overlay over an image of the oral cavity of the subject, as described herein. The dentist (or other user) may maneuver the needle towards the foramen, aided by the visual augmentation of the foramen overlaid on the image of the oral cavity of the subject. The dentist may continue to move the needle forward towards the foramen until the end of the needle touches the bone. This may be done when the dentist does not have a guidance system on the needle, thus has a lack of 3D assessment of the specific position of the foramen. The dentist may move the needle back a couple of millimeters to contact the foramen. The dentist may then inject the anesthesia to the foramen. Since the foramen are located near the bone, partial accuracy in guidance may be sufficient for the dentist to find the foramen, since guidance provided by at least one embodiment along with touching the bone with the needle provides an accurate 3D understanding of the position of the needle compared to the foramen.

At least one embodiment described herein addresses the technical problem of providing tools for planning a dental implant procedure (e.g., the dentist), by defining the location and angle to drill in order to insert a dental implant. Performing a surgical procedure without planning and deliberation lead to poor surgical and clinical results and complications. Precise drilling at a specific location and at a specific angle may be important, for example, for optimal placement of the dental implant, minimizing damage to surrounding structures, improving osseointegration, enhancing aesthetic outcomes, reducing risk of implant failure, facilitating prosthetic restoration, and the like.

In some existing approaches, imaging studies such as CT are performed. In many cases a technician or a specialist, and in some cases the surgeon themselves, may visualize the imaging study in a 3D suite or use a dedicated surgical planning software and other tools available to view, visualize and measure. These visualizations and measurements may be used to select the optimal parameters for the surgery. For example, selecting the correct implant size. An implant that is too small will not provide strong enough support for loading the crown. On the other hand, an implant that is too long can hit a nerve or exit the bone envelope. After the implant type, size, location and angulation is selected, and the surgical plan is approved by the surgeon, the surgical plan may be exported to 3D tools to create a fixed surgical guide or to program a dynamic navigation system.

The challenge with the existing approaches is that the workflow requires interactions by a specialist. Moreover, the existing planning approaches takes a lot of time, sometimes up to 3 weeks. Many dentists, especially experienced ones, do not want to spend 30 minutes or one hour on planning an implant that would take them about 7 minutes to place. Rather, these dentists rely on their memory and experience to decide their course of action after viewing the CT image, without really making a CAD plan.

At least one embodiment described herein addresses the aforementioned technical problem, and/or improves upon the aforementioned existing approaches, and/or improves upon the aforementioned technical field, by providing tools for making a needle injection plan and/or surgical plan based on imaging modalities (e.g., CT, MRI, and the like) in order to identify and understand the anatomy and/or select the best clinical approach, and/or select the tools to use, for example implant type, implant size, location for insertion of the needle and/or implant, and/or angle at which the needle and/or implant is to be inserted. The plan may take into account the goal of the surgical procedure with respect to the specific personal condition of the patient and/or their anatomy as reflected by the imaging modalities and/or prior examinations.

At least one embodiment described herein addresses the aforementioned technical problem, and/or improves upon the aforementioned existing approaches, and/or improves upon the aforementioned technical field, by providing tools for allowing dentists to generate an accurate injection plan and/or surgical plan. The plan(s) may be generated dynamically and/or substantially immediately prior to the injection and/or surgery, such as in cases that they would otherwise avoid making. The ability to present the plan as an overlay on images depicting the mouth of the subject prior to execution of the injection and/or surgery can also help visualize the end result. Using prior approaches, using a general 3D tool for planning does not provide alerts on misplacement and/or there are no alerts indicating adversely affected important anatomical landmarks. In contrast, in at least one embodiment described herein, the dentist is provided with alerts, and the source of the alert may be visualized. For example, if the plan is for placing the needle and/or implant too close to the nerve, the distance may be measured and/or automatically presented. The alert may visually highlight that the distance is too close to the user, enabling the user to react and correct the plan (e.g., immediately and/or quickly), prior to performing the injection and/or surgery.

At least one embodiment described herein addresses the aforementioned technical problem, and/or improves upon the aforementioned existing approaches, and/or improves upon the aforementioned technical field, by dynamically updating an overlay over a GUI depicting sequential frames of an oral cavity of a subject captured by an image sensor. The overlay depicts a virtual angle and/or a virtual location of a virtual vector that corresponds to a real-world location and/or real-world angle of a real-world tool, optionally a dental syringe with a needle for injection of anesthesia into a jaw of the subject, and/or a drill having a bur used for drilling into the jaw of the subject for insertion of a dental implant, which may connect to a dental prosthesis. The virtual vector indicates a location and angle for injection by the dental syringe and/or for drilling by the bur of the drill for implanting the dental implant. The virtual vector presented on the GUI over the frames of the oral cavity is dynamically updated in response to manipulations of the real-world tool by the user. The GUI enables the user to use the tool to manipulate the virtual vector for planning the location and angle for injection of anesthesia using the needle and/or for drilling using the bur of the drill. Other visual elements as described herein may be presented in the GUI and dynamically updated accordingly.

In at least one embodiment described herein, the user (e.g., dentist) may use a hand-piece, such as the dental syringe and/or the dental drill, as a 3D positioning input mechanism (e.g., like a 3D mouse). One potential advantage to this approach is that the user is used to this tool and feels comfortable directing it. Another potential advantage to this approach is that when the user is planning and moving the tool, the user is also positioning needle and/or positioning the implant in a way that is easier for the user to access. The user may actually rehearse injection of anesthesia prior to actual insertion of the needle and/or may actually rehearse a surgical approach to the location and/or angle physically before final placement of the dental implant. The likelihood that the user (e.g., dentist) will place the needle and/or the implant in a location that is not feasible and/or is not easy to access is reduced or eliminated based on using approaches according to at least one embodiment described herein. In contrast, such situation of infeasible access may occur when planning the injection and/or surgery offline on a standard 3D application with a mouse that does not have 3D degrees of freedom. Moreover, such standard applications do not take into account the specific physical limitations of the specific patient, the specific dentist, and specific tools used. In contrast, using at least one embodiment described herein to plan the injection and/or surgery may save a lot of time in the process and/or make it easy for the dentist to use their own tools in designing the surgical plan, in particular without the need to learn and operate complex 3D imaging software on a computer.

At least one embodiment described herein addresses the technical problem of a user performing an injection of an anesthetic agent needing to known the exact location and angle to inject in order to obtain anesthetized tissues and/or the user performing the dental implant procedure (e.g., the dentist) needing to know the exact location and angle to drill in order to insert a dental implant. Precise injection and/or drilling at a specific location and at a specific angle may be important, for example, for optimal anesthetization of tissues, optional placement of the dental implant, minimizing damage to surrounding structures, improving osseointegration, enhancing aesthetic outcomes, reducing risk of implant failure, facilitating prosthetic restoration, and the like.

Some existing dynamic navigation systems direct the dentist by presenting location and angulation information and tracking on a side screen view in 2D. The first view may present location information with concentric circles that are centered around the point of entry. A virtual driller is shown from a top view that is supposed to mimic the real driller top view as tracked by the system. The goal of the dentist is to align the virtual driller to the center of the concentric circles. The second view shows angulation tilt from both buccal-lingual axis (angulation) and the teeth centerline axis (angulation). The dentist needs to use these views in order to locate the driller in the right angle of the planned drilling vector. The third view is a progress bar that tracks the depth of the dill during the procedure. Such existing solutions visualize the navigation directions for the dentist on an external screen (i.e., not at the line of sight), and the decomposed 2D views are disjoint from each other and from the operation of the driller. Therefore, such existing solutions are very complicated for users to learn and operate. These existing solutions are not intuitive and are un-natural for the dentist to use.

At least one embodiment described herein addresses the aforementioned technical problem, and/or improves upon the aforementioned existing approaches, and/or improves upon the aforementioned technical field, by using a previously generated injection plan and/or dental plan, for example, automatically computed based on distances and/or directions to nearby anatomical structures (e.g., specific teeth, nerves, roots of teeth, anatomical locations of the jawbone), and/or created as described herein, for guiding the location and/or angle of the needle and/or drill. Using the previously generated injection plan and/or dental plan, the user is dynamically provided with visual guidance (e.g., instructions) for directing the needle and/or drill to the correct entry point location and at the correct angulation. The injection and/or drilling operation may be tracked in real time, in order to verify that the injection and/or drilling is accurately following the plan and not deviating from the preoperative plan (e.g., depth and/or trajectory).

At least one embodiment described herein addresses the aforementioned technical problem, and/or improves upon the aforementioned existing approaches, and/or improves upon the aforementioned technical field, by generating a single view at the line of sight of the user that includes guidance for both location and angulation and shows the user progress to the correct location and angle. The user is guided by placing one visual element which is fixed, representing the target location and/or angle for injection and/or drilling, overlaid over another visual element representing the current location and/or angle of the needle and/or drill. Non-overlap represents misalignment to be corrected by manipulations of the syringe and/or drill. A direct overlap indicates that the syringe and/or drill is at the target location.

At least one embodiment described herein addresses the aforementioned technical problem, and/or improves upon the aforementioned existing approaches, and/or improves upon the aforementioned technical field, by for generating and/or updating a user interface, optionally a graphical user interface (GUI) for guiding injection and/or drilling and/or positioning of a dental implant in a subject. The GUI may be presented within an augmented reality (AR) device worn by a user (e.g., dentist), and/or presented on a display such as for viewing by an assistant to the user (e.g., dental assistant). A target vector is presented over frames of an oral cavity of the subject captured by a camera during a dental procedure, within the GUI, optionally as an overlay. The target virtual vector includes a target vector defining a target location and/or a target angle for injection by a real-world needle of a real-world syringe and/or for drilling by a real-world bur of a real-world drill for insertion of the dental implant. The target angle may represent an optimal and/or easy angle for injection by the needle of the syringe. A real-world location and/or real-world angle of the real-world needle of the dental syringe and/or of the bur of the drill may be computed during manipulations by a user (e.g., dentist performing the injection and/or implant procedure). A current virtual vector including a virtual location and/or virtual angle may be computed. The current virtual vector corresponds to the real-world location and/or the real-world angle of the real-world needle and/or bur. The current virtual vector is dynamically adapted in response to manipulations of the syringe and/or drill by the user. The current virtual vector is presented over the frames, optionally within the overlay or as a second overlay. The current virtual vector may be simultaneously presented with the target virtual vector. The user may use the current virtual vector presented in the GUI to guide real-world manipulations of the syringe for injection and/or the drill for drilling, at the target virtual vector. Optionally, an indication of a misalignment between the current virtual vector and the target virtual vector is monitored and/or dynamically computed, and presented within the GUI. Alternatively or additionally, an indication for reducing the misalignment for obtaining an alignment between the current virtual vector and the target virtual vector may be presented within the GUI. The user may use the indication of misalignment and/or the indication for reducing the misalignment to manipulate the syringe to position the needle and/or manipulate the drill to position the bur, at the physical location within the mouth of the subject corresponding to the target virtual vector.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2A:
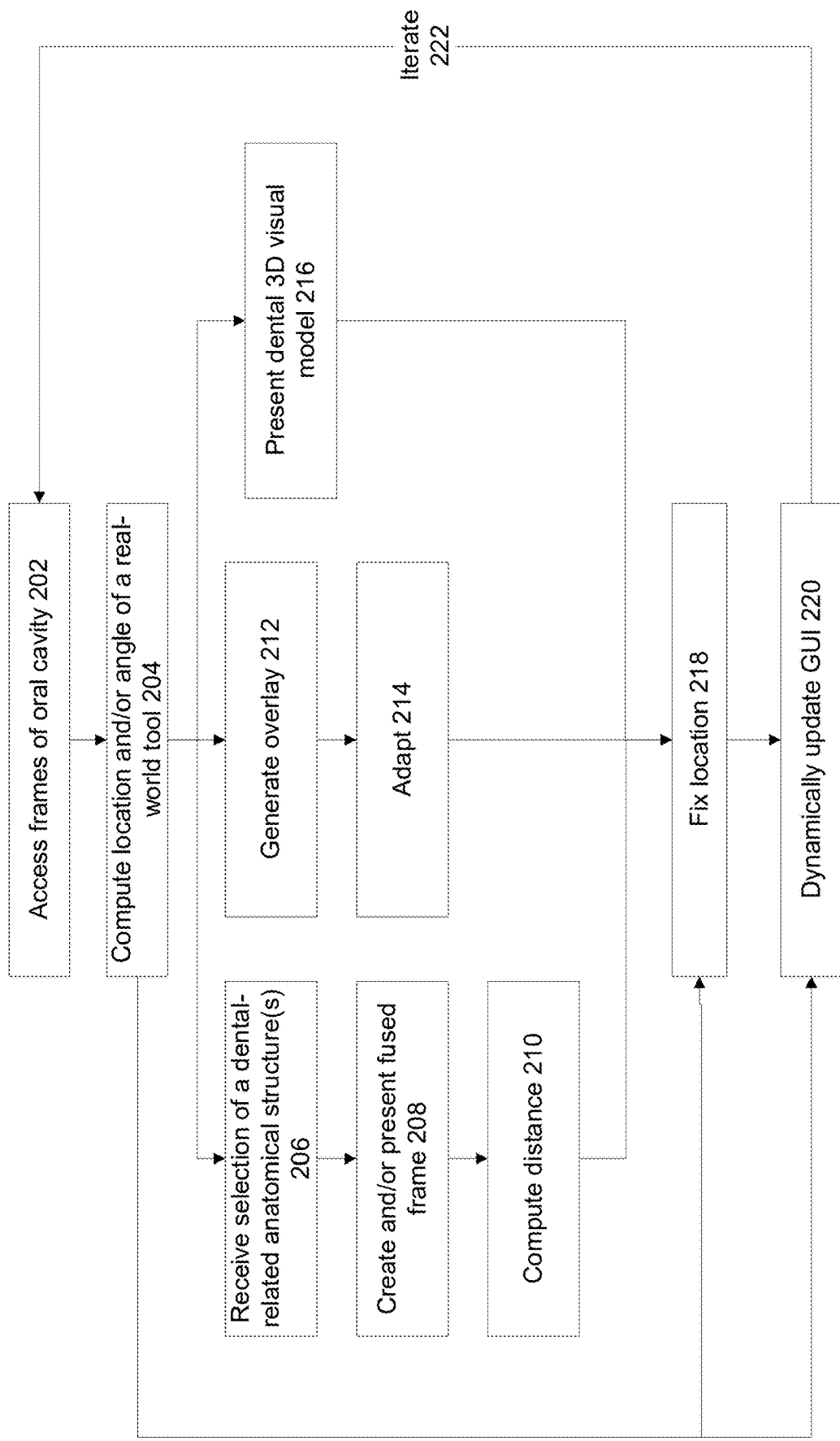
FIG. 2A is a flowchart of a method of generating and/or updating a GUI for planning positioning of a dental syringe and/or a dental implant in a subject, in accordance with some embodiments of the present invention.
Figure 2B:
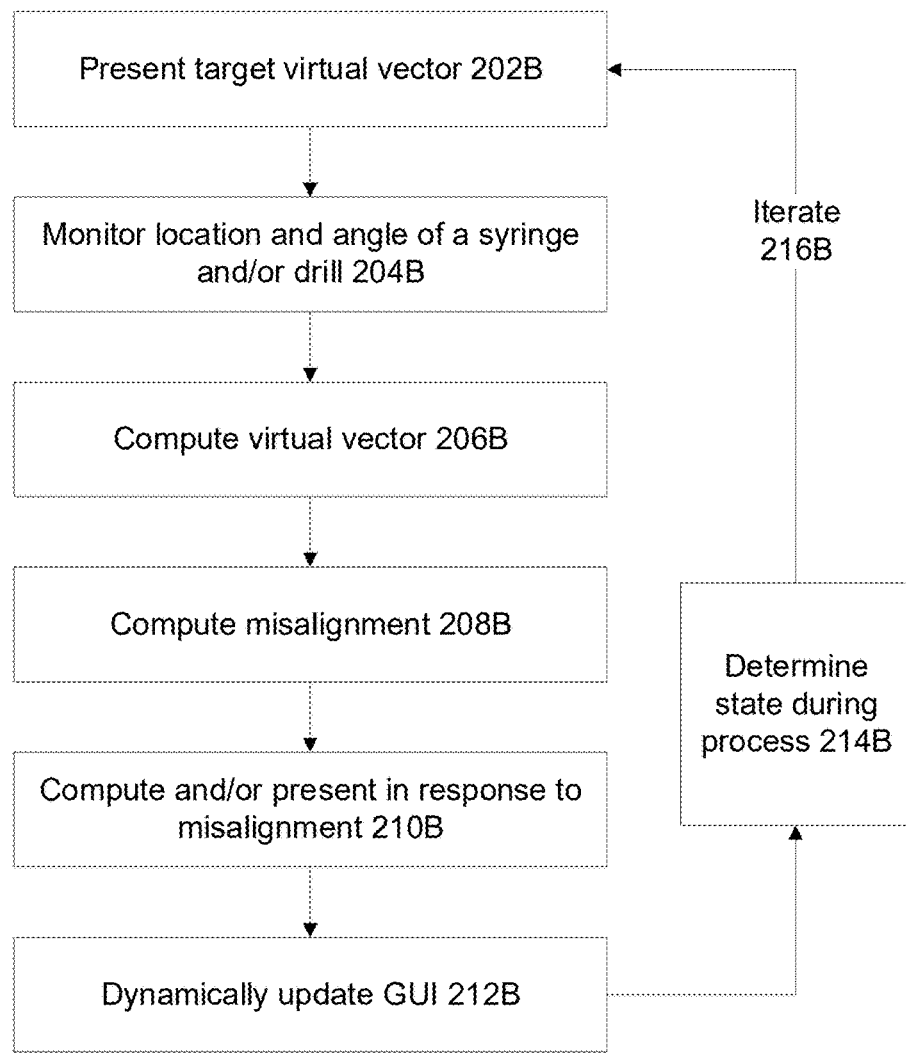
FIG. 2B is a flowchart of a method of creating and/or updating a GUI for guiding positioning of a needle and/or a dental implant in a subject, in accordance with some embodiments of the present invention.
Figure 3:
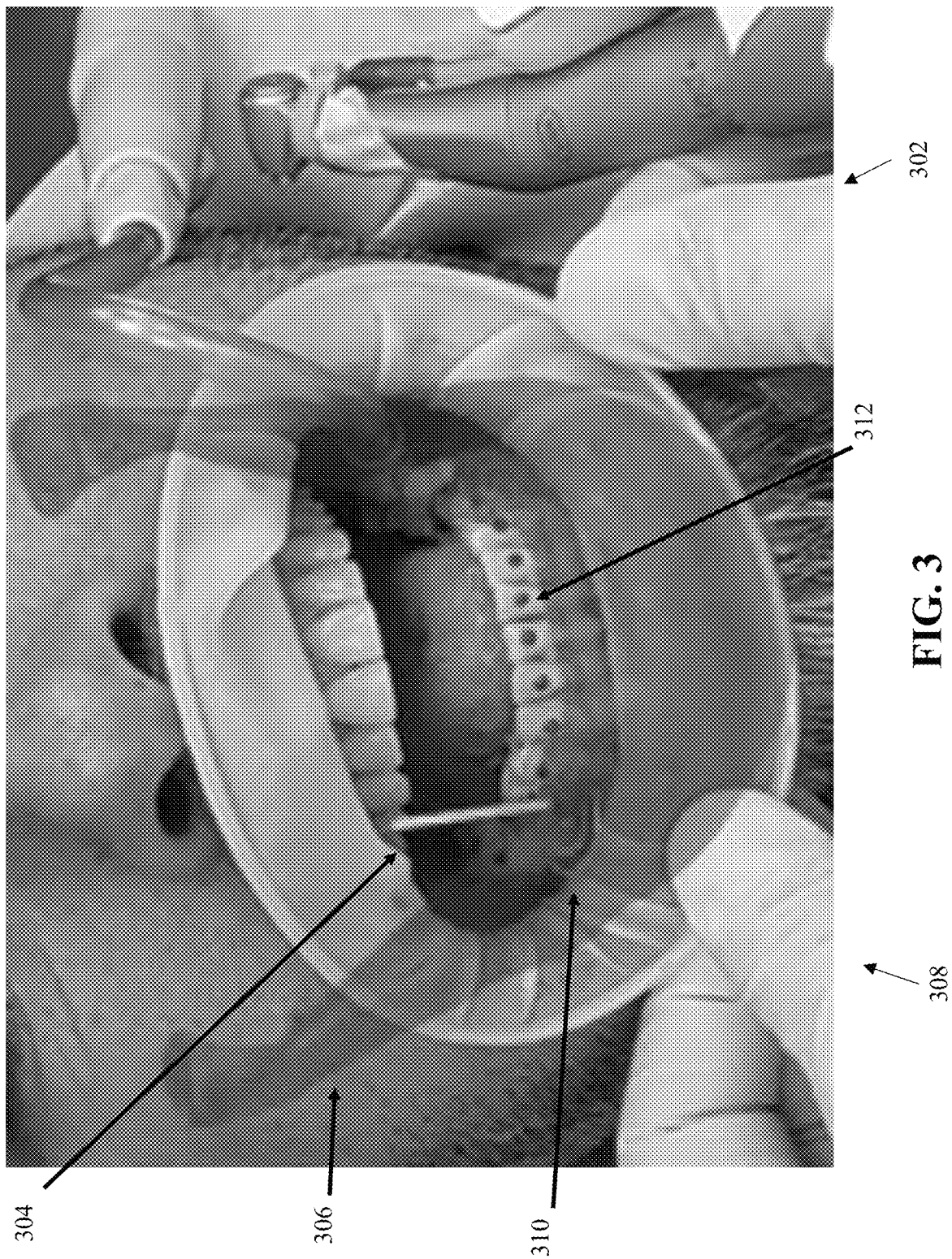
FIG. 3 is a schematic of an exemplary GUI depicting a virtual vector positioned within a dental-related anatomical structure overlaid on a frame, in accordance with some embodiments of the present invention.
Figure 4:
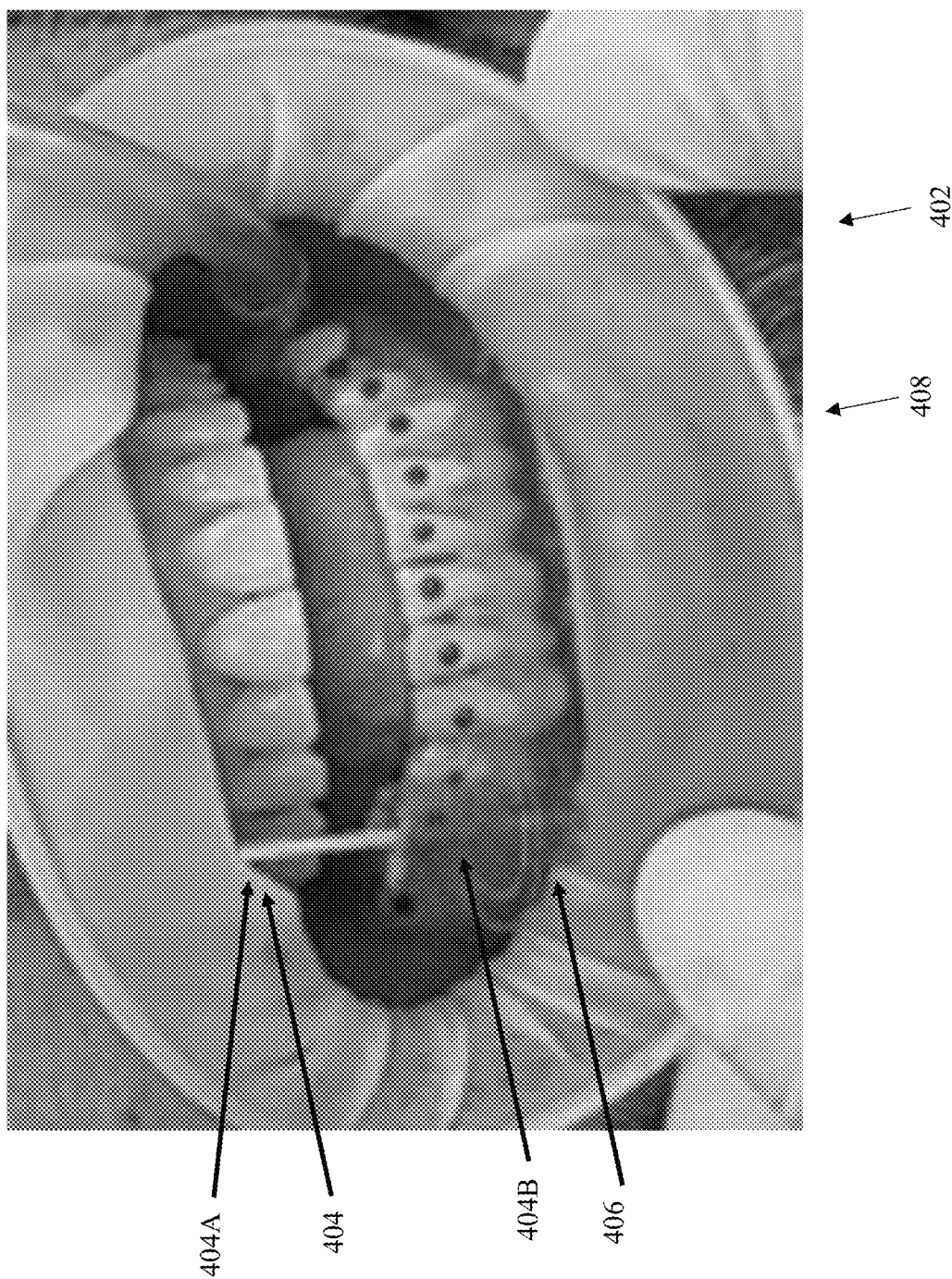
FIG. 4 is a schematic of an exemplary GUI depicting a 3D virtual model of a dental implant positioned with respect to a virtual vector overlaid on a frame, in accordance with some embodiments of the present invention.
Figure 5:
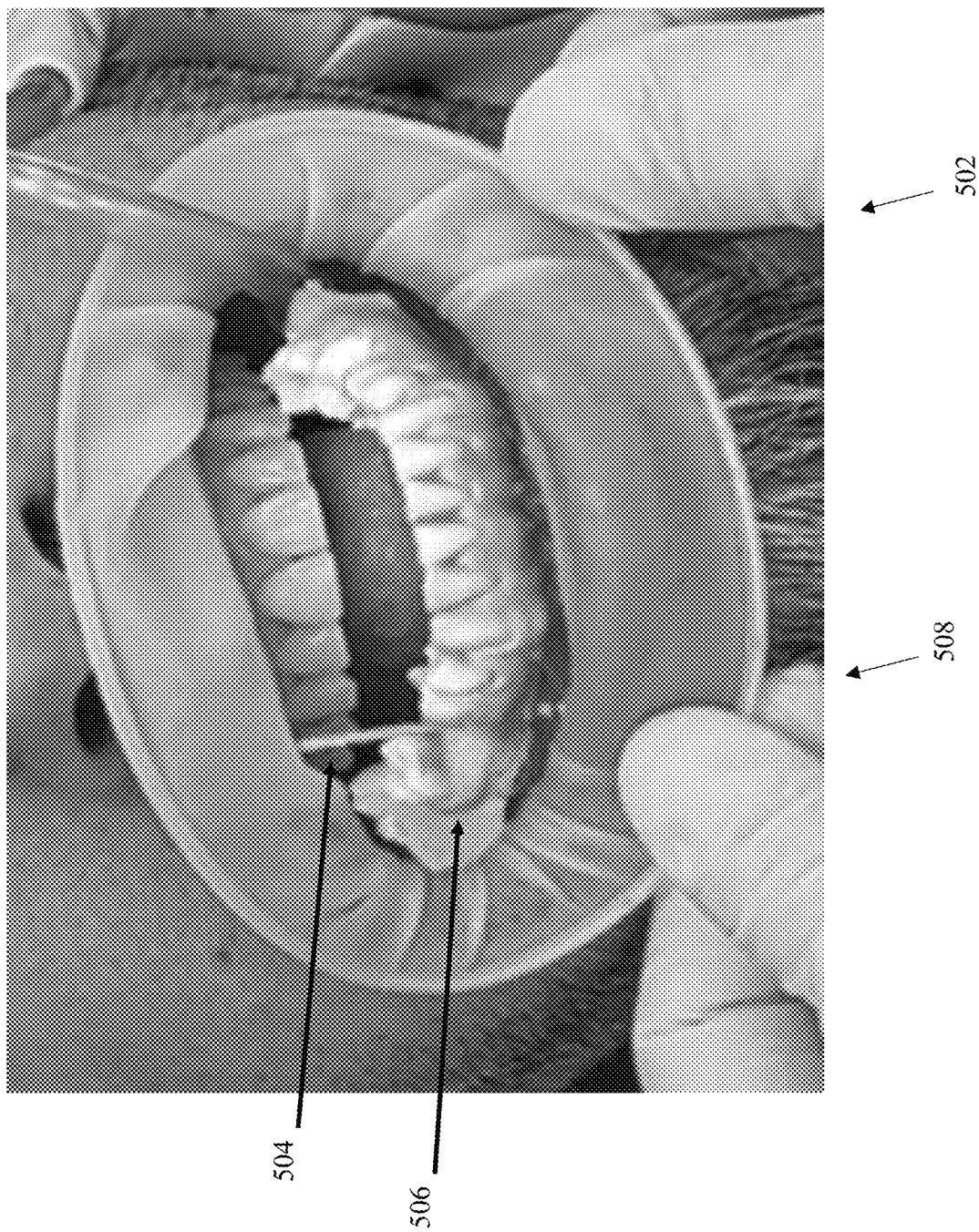
FIG. 5 is a schematic of an exemplary GUI depicting a virtual vector positioned within a dental 3D visual model overlaid on a frame, in accordance with some embodiments of the present invention.
Figure 6:
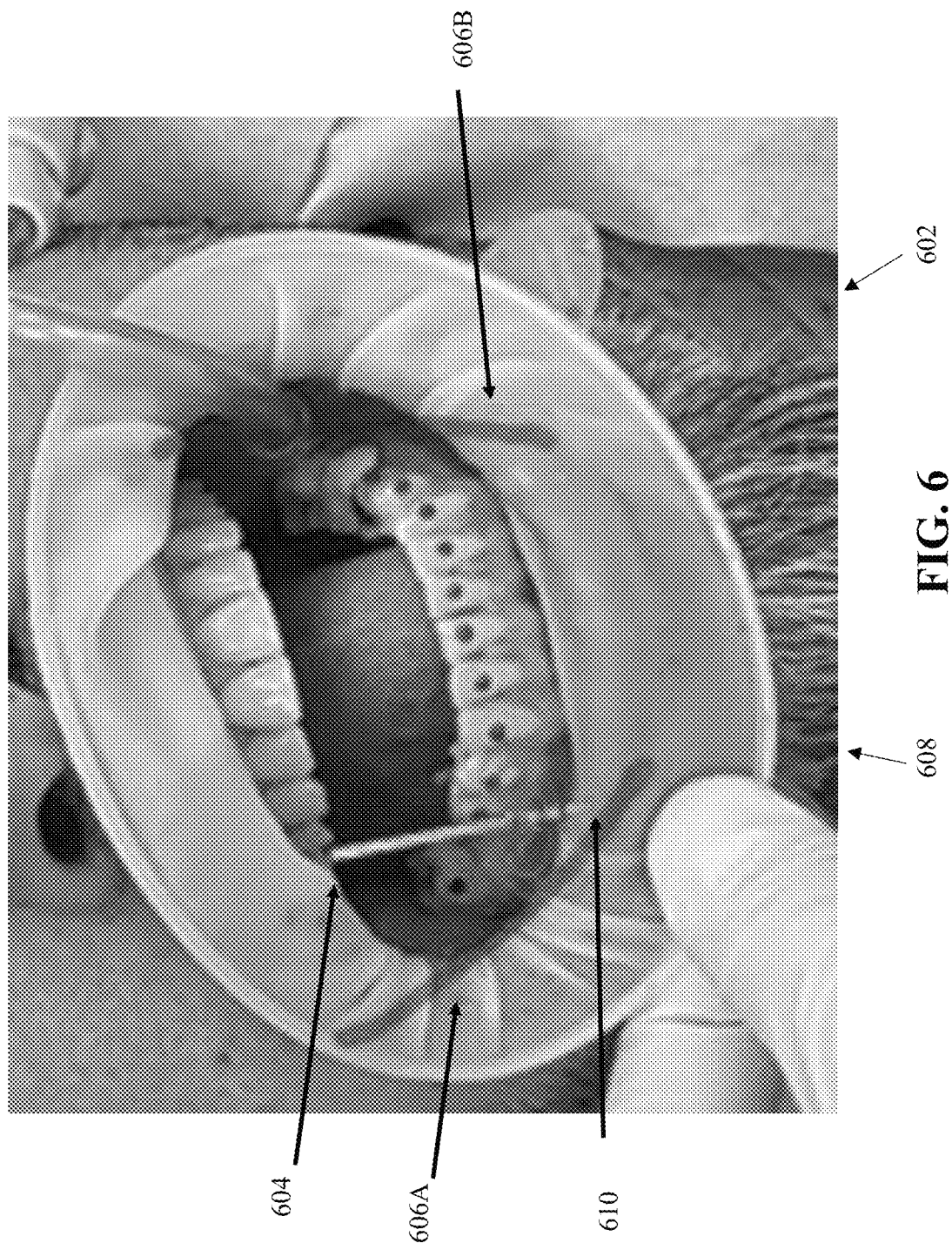
FIG. 6 is a schematic of an exemplary GUI depicting a virtual vector positioned relative to another dental-related anatomical structure overlaid on a frame, in accordance with some embodiments of the present invention.
Figure 7:
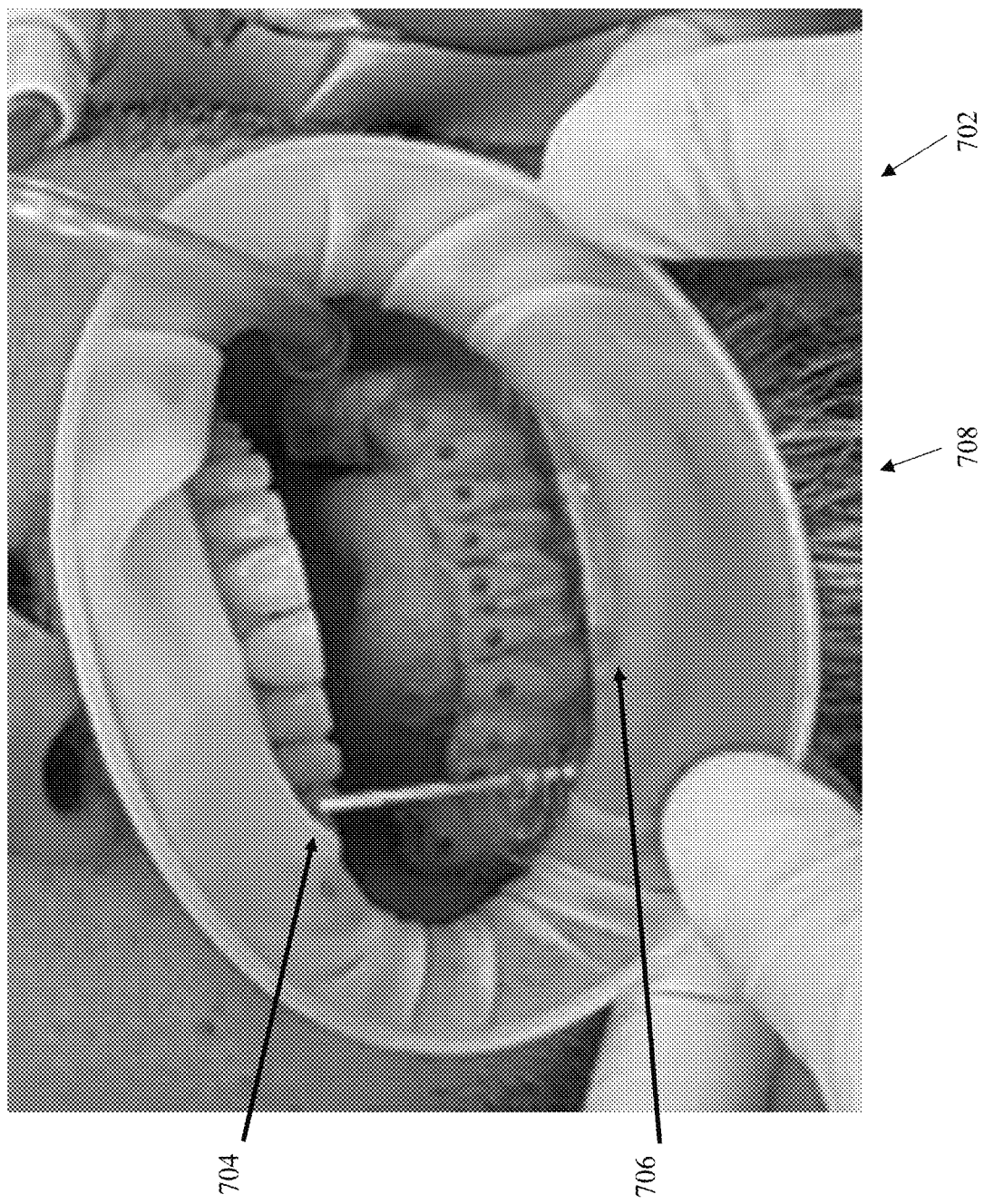
FIG. 7 is a schematic of an exemplary GUI depicting a virtual vector positioned relative to yet another dental-related anatomical structure overlaid on a frame, in accordance with some embodiments of the present invention.
Figure 8:
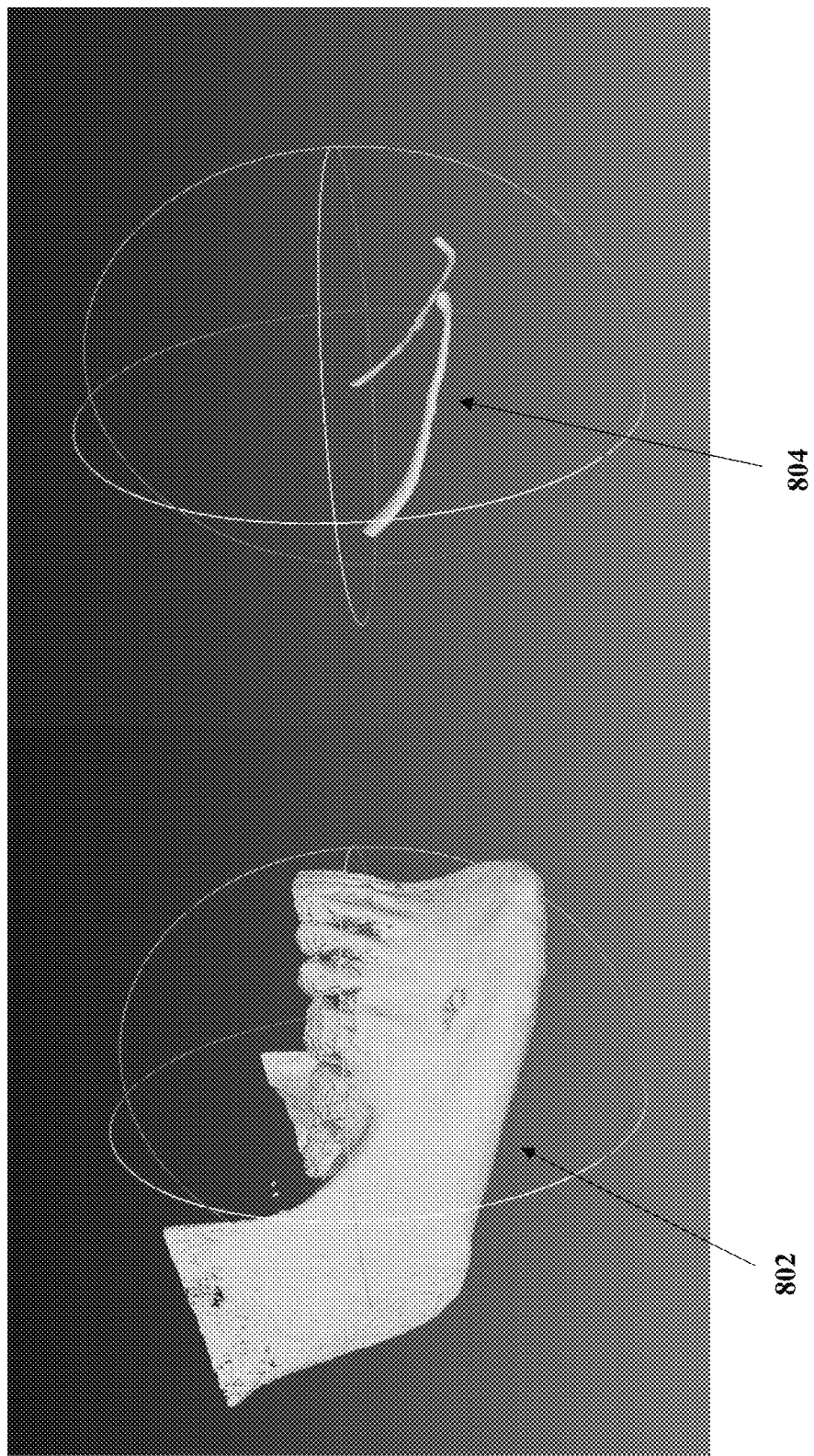
FIG. 8 which includes exemplary dental-related anatomical structures of the subject, in accordance with some embodiments of the present invention.
Figure 9:
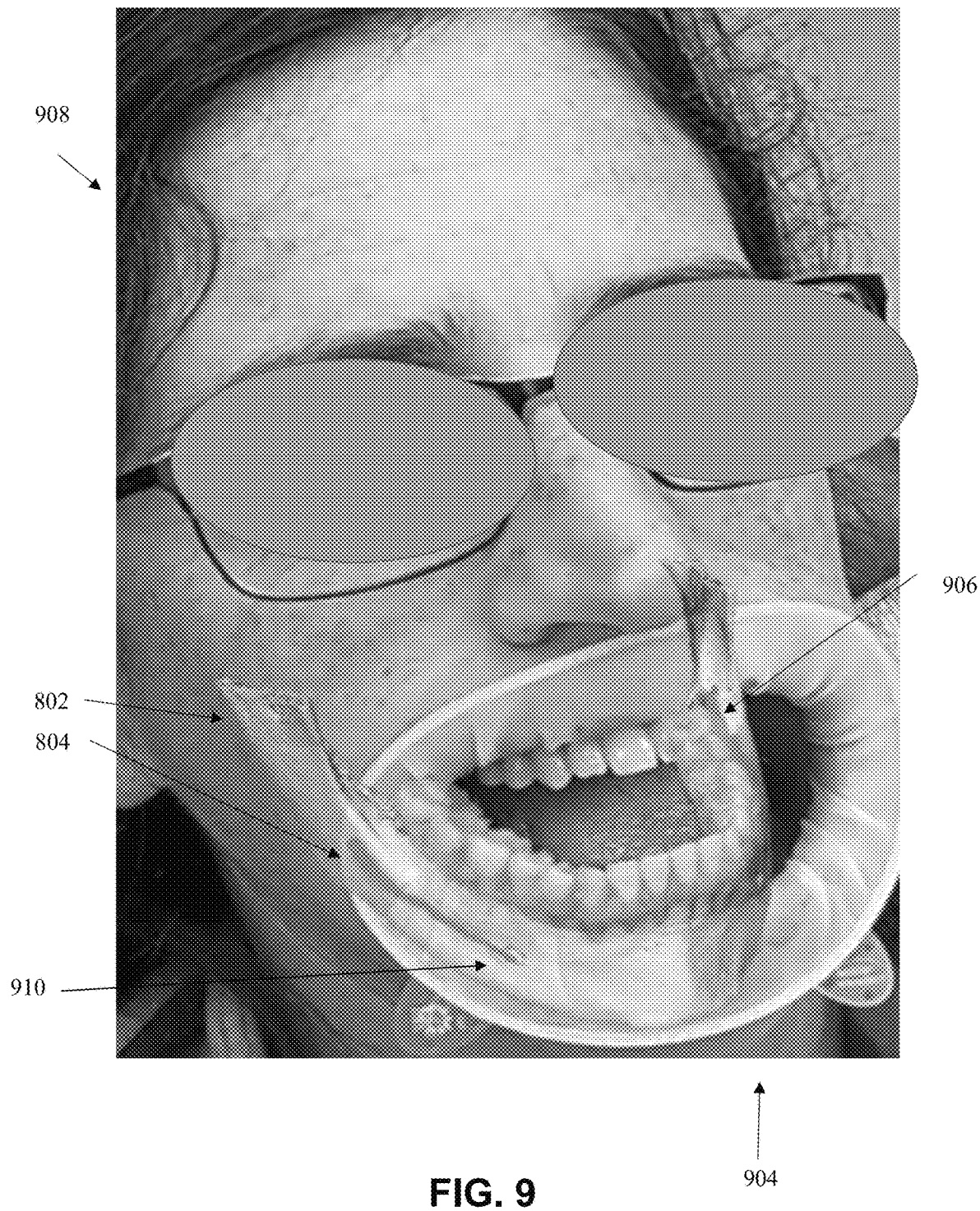
FIG. 9 depicts a GUI presenting a fused image of a subject's oral cavity with the dental-related anatomical structures of FIG. 8 and/or with a dental 3D visual model, in accordance with some embodiments of the present invention.
Figure 10:
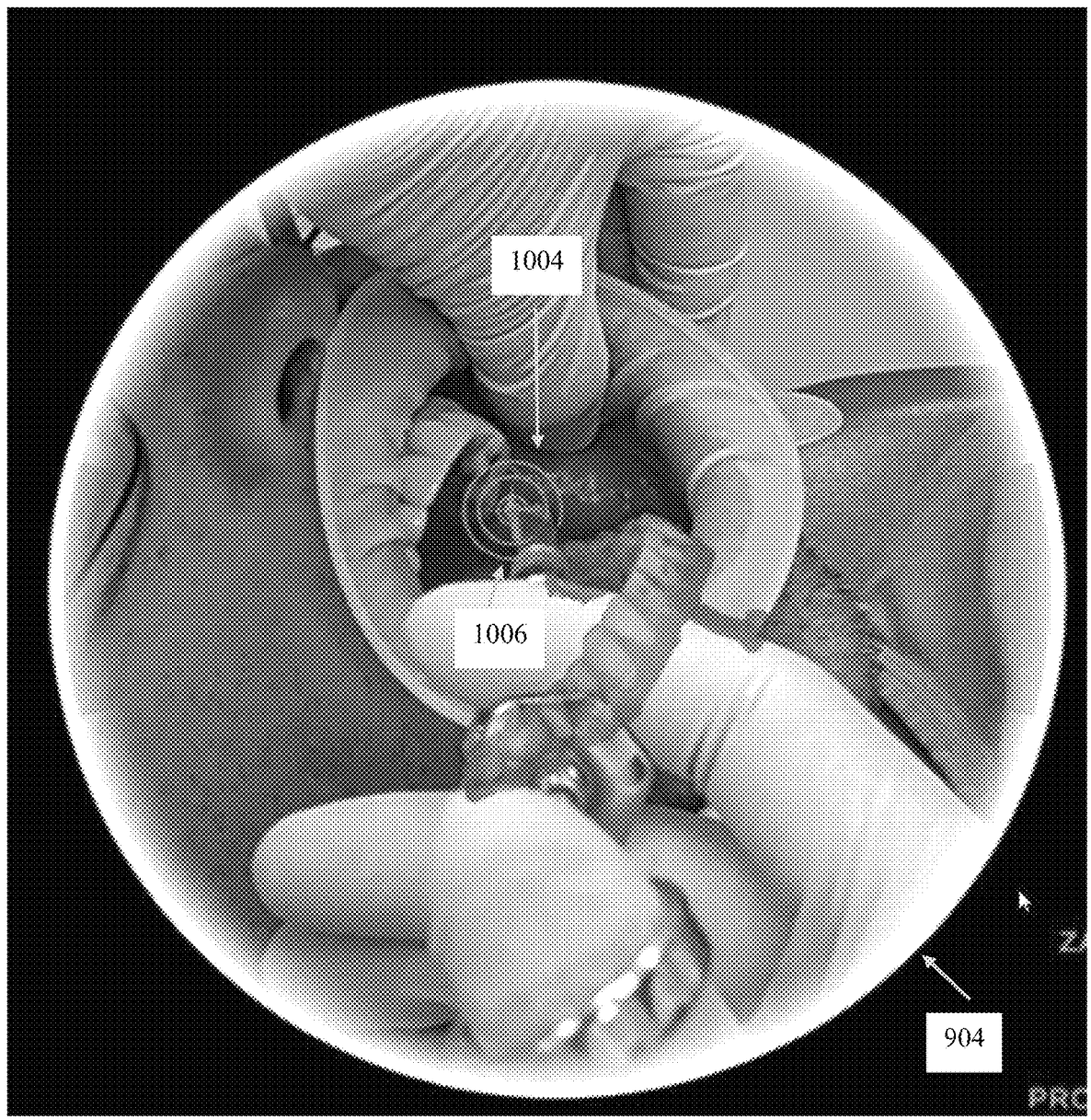
FIG. 10 includes a GUI depicting concentric circles for guiding an injection, in accordance with some embodiments of the present invention.
Figure 11:
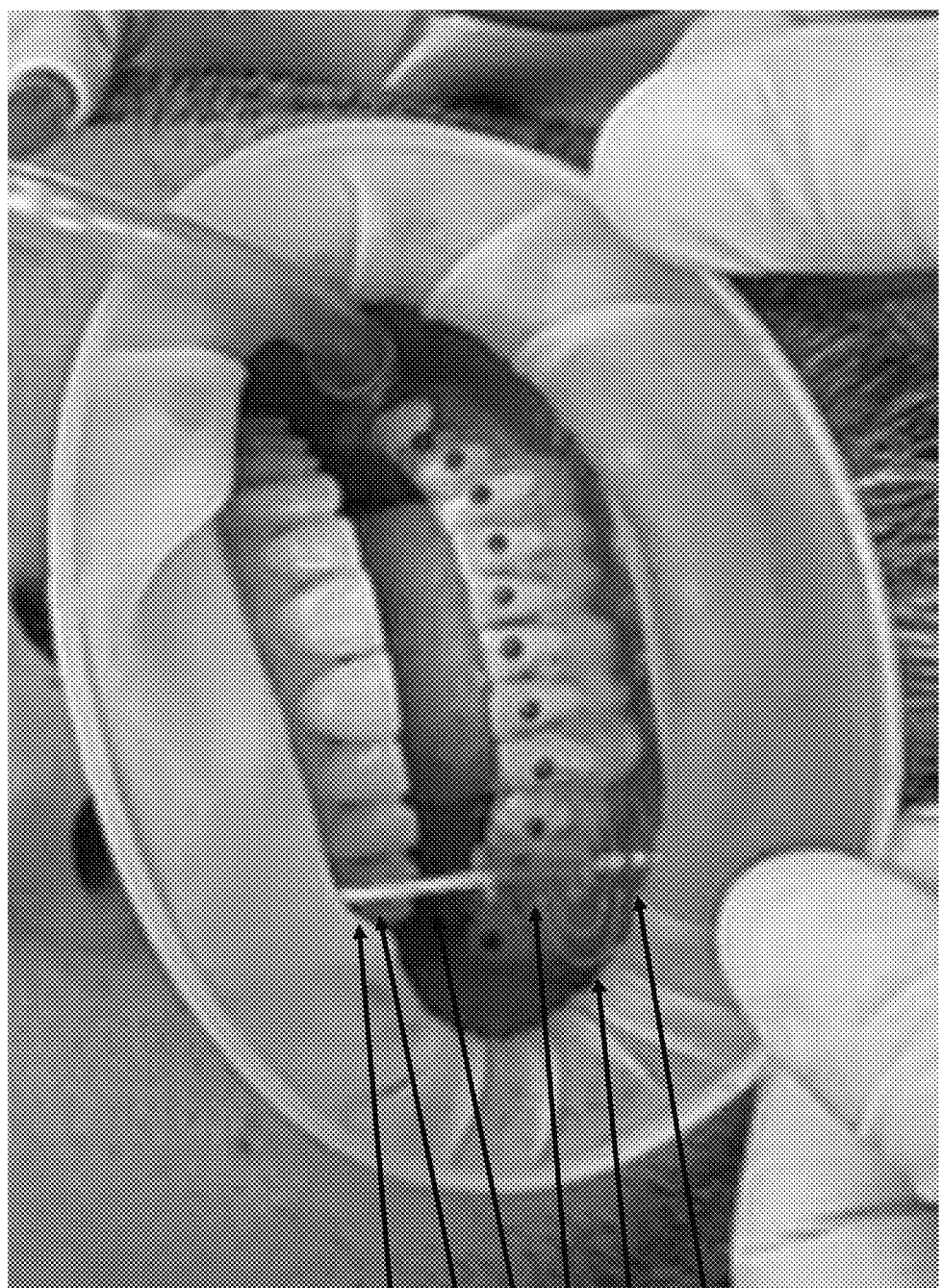
FIG. 11 is a schematic of an exemplary GUI including a target virtual vector overlaid on a frame depicting an oral cavity of a subject, in accordance with some embodiments of the present invention.
Figure 12:
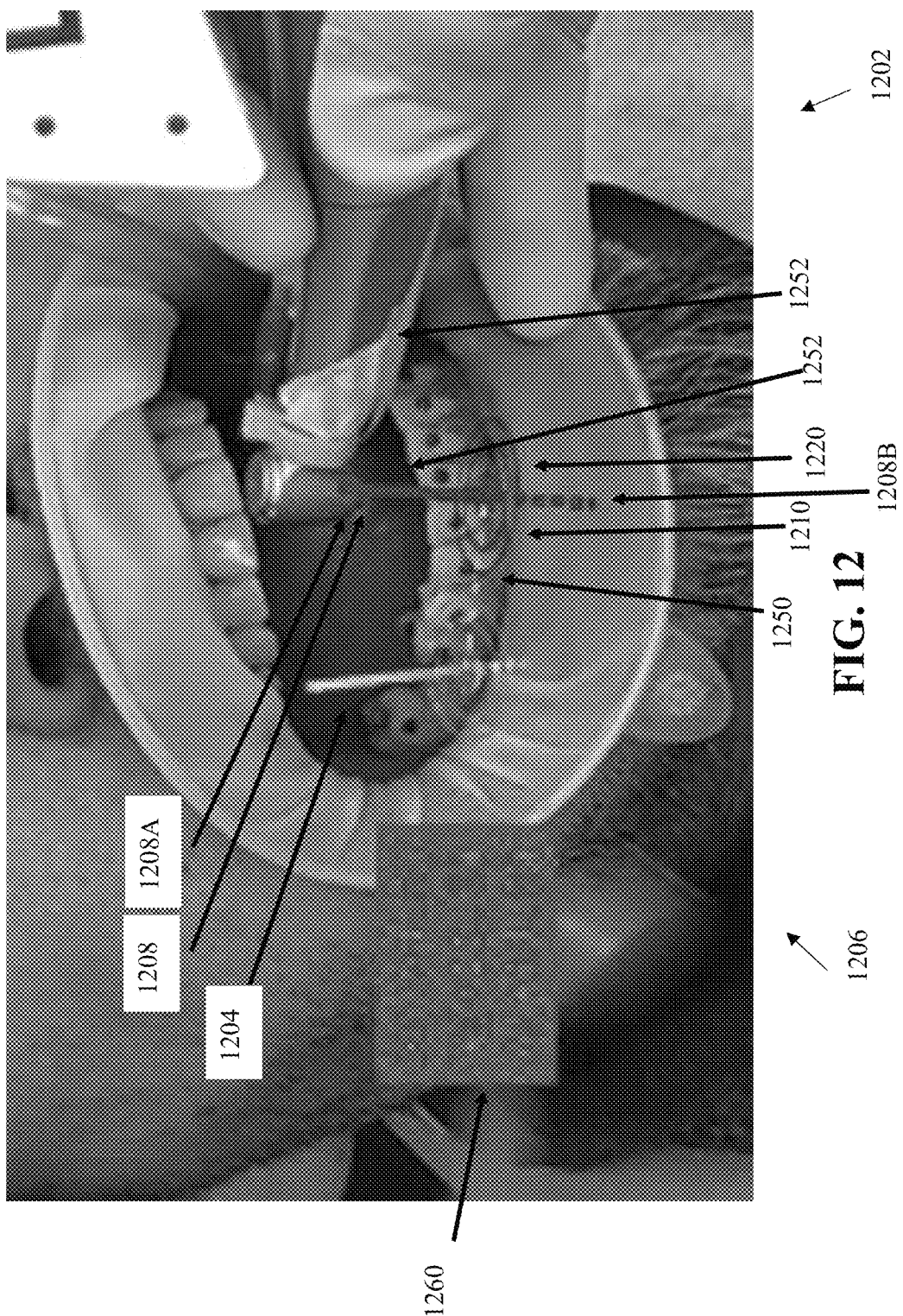
FIG. 12 is a schematic of an exemplary GUI depicting a misalignment between a target virtual vector and a current virtual vector overlaid on a frame depicting an oral cavity of a subject, in accordance with some embodiments of the present invention.
Figure 13:
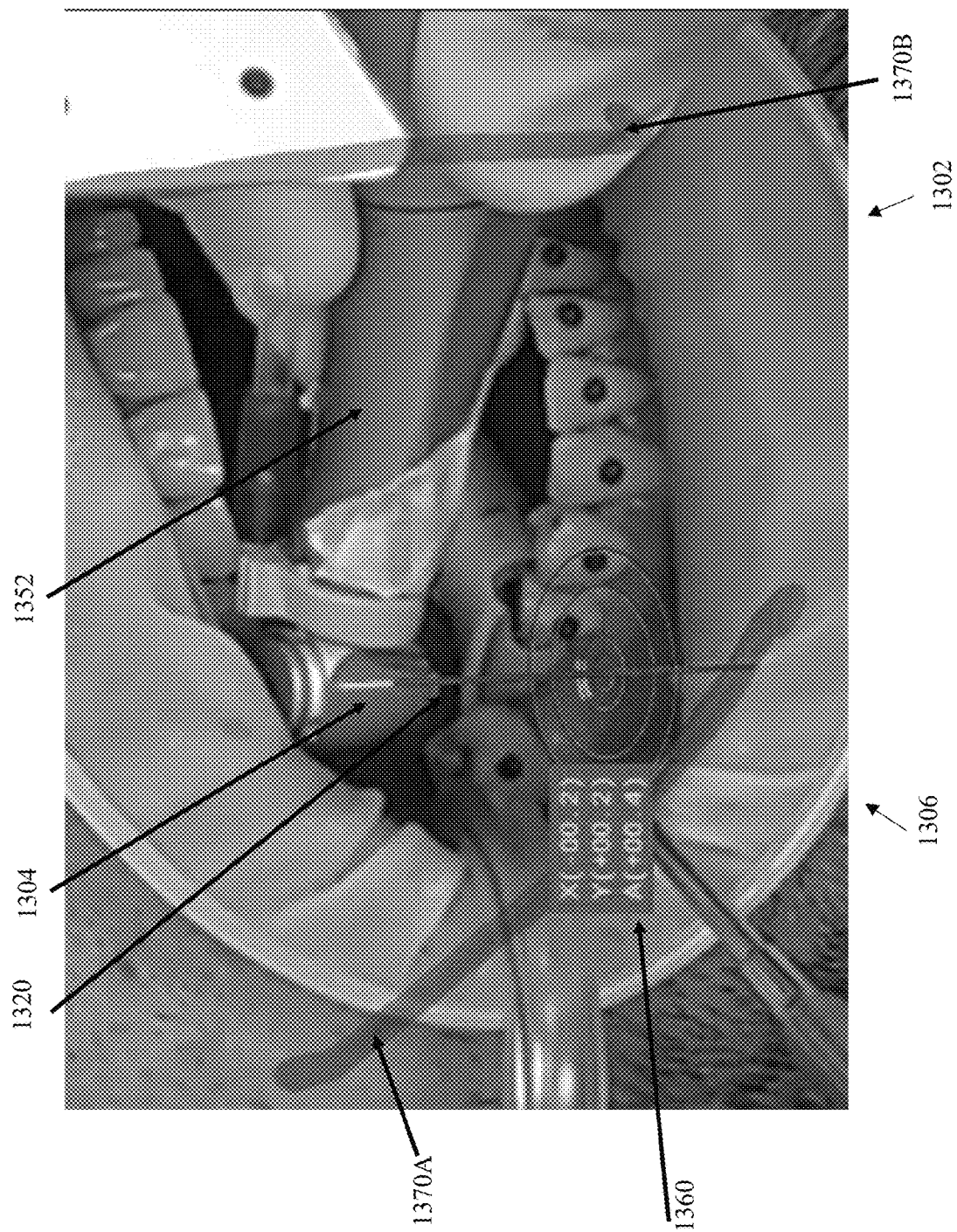
FIG. 13 is a schematic of an exemplary GUI depicting an alignment between a target virtual vector and a current virtual vector overlaid on a frame depicting an oral cavity of a subject, in accordance with some embodiments of the present invention.
Figure 14:
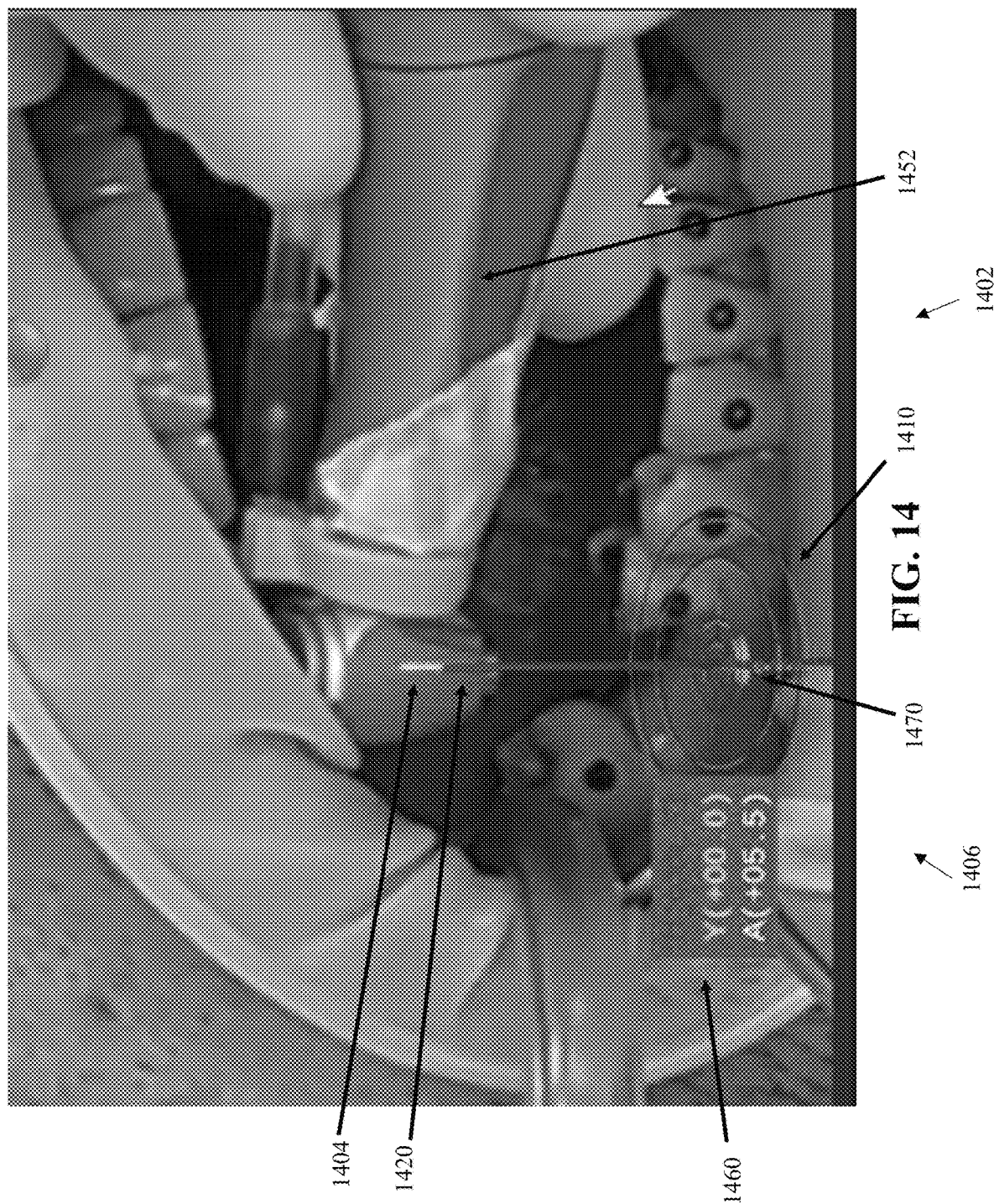
FIG. 14 is a schematic of an exemplary GUI depicting a small misalignment between a target virtual vector and a current virtual vector overlaid on a frame depicting an oral cavity of a subject, in accordance with some embodiments of the present invention.
Figure 15:
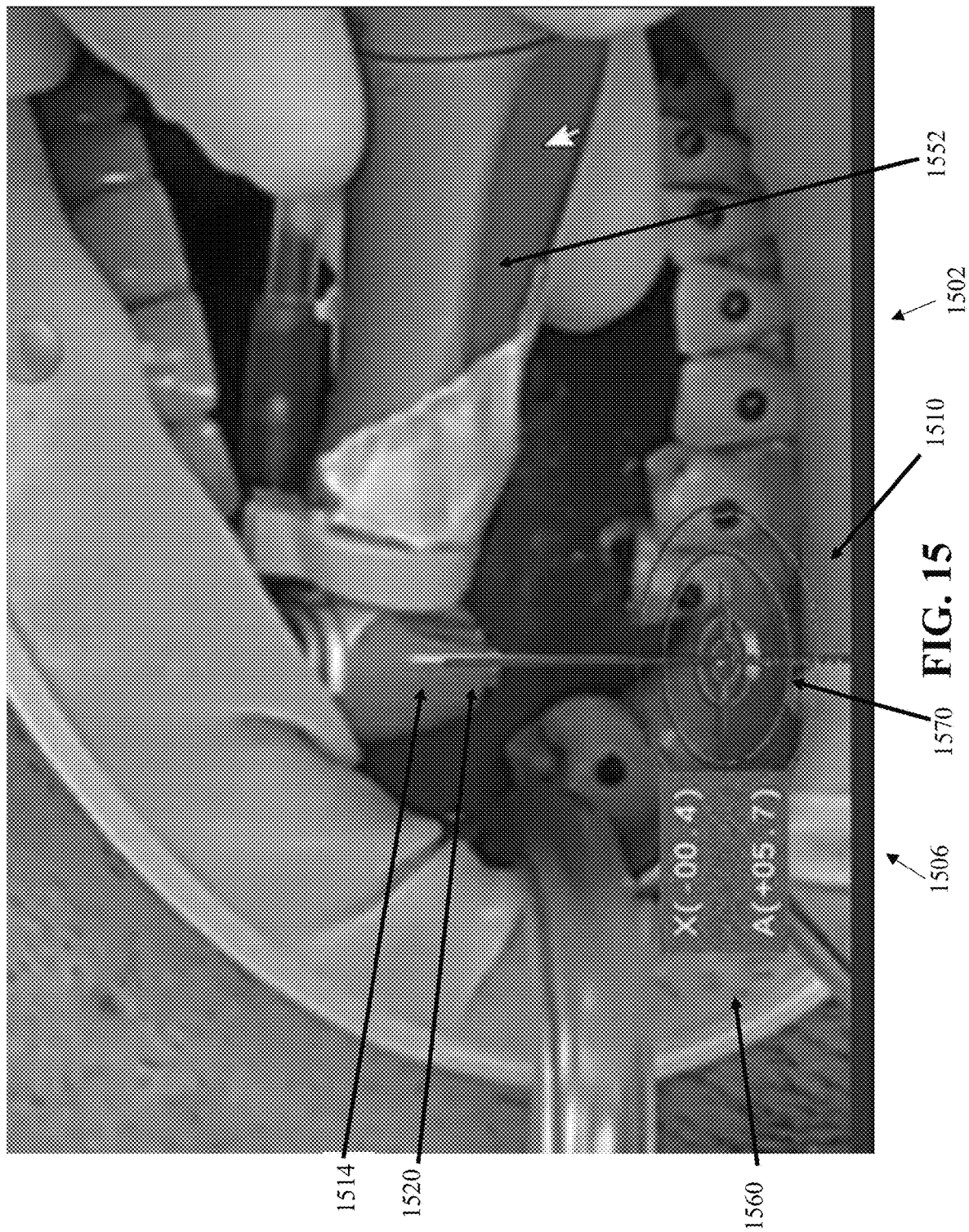
FIG. 15 is a schematic of an exemplary GUI depicting another small misalignment between a target virtual vector and a current virtual vector overlaid on a frame depicting an oral cavity of a subject, in accordance with some embodiments of the present invention.

Reference is now made to FIG. 1, which is a block diagram of a system 100 for generating and/or updating a GUI for planning positioning of a dental syringe and/or a dental implant in a subject, in accordance with some embodiments of the present invention. Reference is also made to FIG. 2A, which is a flowchart of a method of generating and/or updating a GUI for planning positioning of a dental syringe and/or a dental implant in a subject, in accordance with some embodiments of the present invention. Reference is also made to FIG. 2B, which is a flowchart of a method of creating and/or updating a GUI for guiding positioning of a needle and/or a dental implant in a subject, in accordance with some embodiments of the present invention. Reference is also made to FIG. 3, which is a schematic of an exemplary GUI 302 depicting a virtual vector 304 positioned within a dental-related anatomical structure 306 overlaid on a frame 308, in accordance with some embodiments of the present invention. Reference is also made to FIG. 4, which is a schematic of an exemplary GUI 402 depicting a 3D virtual model of a dental implant 406 positioned with respect to a virtual vector 404 overlaid on a frame 408, in accordance with some embodiments of the present invention. Reference is also made to FIG. 5, which is a schematic of an exemplary GUI 502 depicting a virtual vector 504 positioned within a dental 3D visual model 506 overlaid on a frame 508, in accordance with some embodiments of the present invention. Reference is also made to FIG. 6, which is a schematic of an exemplary GUI 602 depicting a virtual vector 604 positioned relative to another dental-related anatomical structure 606 overlaid on a frame 608, in accordance with some embodiments of the present invention. Reference is also made to FIG. 7, which is a schematic of an exemplary GUI 702 depicting a virtual vector 704 positioned relative to yet another dental-related anatomical structure 706 overlaid on a frame 708, in accordance with some embodiments of the present invention. Reference is also made to FIG. 8, which includes exemplary dental-related anatomical structures 802 and 804 of the subject, in accordance with some embodiments of the present invention. Reference is also made to FIG. 9, which depicts a GUI presenting a fused image 904 of a subject's oral cavity with the dental-related anatomical structures 802 and 804 of FIG. 8 and/or with a dental 3D visual model 906, in accordance with some embodiments of the present invention. Reference is also made to FIG. 10, which includes a GUI 1002 depicting concentric circles 1004 for guiding an injection, in accordance with some embodiments of the present invention. Reference is also made to FIG. 11, which is a schematic of an exemplary GUI 1102 including a target virtual vector 1104 overlaid on a frame 1106 depicting an oral cavity of a subject, in accordance with some embodiments of the present invention. Reference is also made to FIG. 12, which is a schematic of an exemplary GUI 1202 depicting a misalignment between a target virtual vector 1204 and a current virtual vector 1220 overlaid on a frame 1206 depicting an oral cavity of a subject, in accordance with some embodiments of the present invention. Reference is also made to FIG. 13, which is a schematic of an exemplary GUI 1302 depicting an alignment between a target virtual vector 1304 and a current virtual vector 1320 overlaid on a frame 1306 depicting an oral cavity of a subject, in accordance with some embodiments of the present invention. Reference is also made to FIG. 14, which is a schematic of an exemplary GUI 1402 depicting a small misalignment between a target virtual vector 1404 and a current virtual vector 1420 overlaid on a frame 1406 depicting an oral cavity of a subject, in accordance with some embodiments of the present invention. Reference is also made to FIG. 15, which is a schematic of an exemplary GUI 1502 depicting another small misalignment between a target virtual vector 1504 and a current virtual vector 1520 overlaid on a frame 1506 depicting an oral cavity of a subject, in accordance with some embodiments of the present invention.

System 100 described with reference to FIG. 1 may implement the features of the method described with reference to FIG. 2A and/or 2B, by one or more processors 102 of a computing environment 104 executing code instructions 106A stored on a memory 106.

Computing environment 104 may be implemented as, for example, a client terminal, a server, a virtual machine, a virtual server, a computing cloud, a mobile device, a desktop computer, a thin client, a Smartphone, a Tablet computer, a laptop computer, and an augmented reality device. Computing environment 104 may include an advanced visualization workstation that sometimes is add-on to a dentistry workstation and/or other devices.

Computing environment 104 may receive image(s) captured by image sensor(s) 112, process the images optionally using additional data (e.g., obtained from data storage device 152, repository of data 120A, and/or other sources), and generate a presentation (e.g., fused images and/or overlays) on a user interface 150, optionally an augmented reality presentation, as described herein.

Image sensor(s) 112 may be implemented as cameras capturing images in the visible light spectrum for example, CCD, CMOS sensors, and/or red green blue (RGB) sensor.

User interface(s) 150 may be implemented as an Augmented Reality (AR) display device, for example, a Head Mounted Display (HMD), AR goggles, and/or the like.

Alternatively or additionally, system 100 includes one or more accessory user interfaces 124, which may be in communication with computing environment 104. Accessory user interface(s) 124 may be used by a user, for example, to input data, such as select which internal anatomical structure of the subject to depict in an overlay over a visible light image of the oral cavity of the subject (e.g., nerves, jawbone, roots of teeth, mental foramen, and/or mandibular foramen), as described herein. For example, accessory user interface(s) 124 may include a microphone and voice activated software to enable the user (e.g., dentist) to issue voice commands, such as for selecting what is presented within the GUI. Accessory user interface(s) 124 may be used, for example, for presenting additional data in addition to, and/or alternatively to, user interface 150. For example, fused images presented within an AR display device may also be presented on a secondary display. In another example, CT scans, oral scans, and the like, which are not presented within the AR display may be presented on the secondary display. Accessory user interface(s) 124 may include, for example, one or more of: a touchscreen, a display screen, a keyboard, a mouse, and voice activated software using speakers and microphone.

Multiple architectures of system 100 based on computing environment 104 may be implemented:

In an exemplary implementation of a localized architecture, computing environment 104 may provide dedicated and/or localized services (e.g., one or more of the acts described with reference to FIG. 2A and/or 2B), for example, to a dentist in a clinic. Computing environment 104 may be implemented within user interface 150, for example, within an AR device. In another example, computing environment 104 may be external to user interface 150, and in local communication with user interface 150, optionally over network 110, such as a local network, a wireless communication channel (e.g., short range), cables, and the like. For example, computing environment 104 is implemented as a dental workstation, a laptop, a desktop, and/or a server in a dental clinic. Computing environment 104 may locally obtain images from image sensors 112, generate the fused image(s) and/or overlay (e.g., as described herein), and provide the fused image(s) and/or overlay for presentation on user interface 150.

In an exemplary implementation of a centralized architecture, computing environment 104 may be implemented as one or more servers (e.g., network server, web server, a computing cloud, a virtual server) that provides centralized services (e.g., one or more of the acts described with reference to FIG. 2A and/or 2B) to one or more interfaces 150 and/or client terminals 108 and/or servers 118 in communication with user interfaces 150 over a network 110, for example, providing software as a service (SaaS), software services accessible using a software interface (e.g., application programming interface (API), software development kit (SDK)), an application for local download, and/or providing functions using a remote access session, such as through a web browser and/or viewing application. For example, computing environment 104 may be implemented as a server in a dental clinic, providing services to multiple client terminals 108 implemented as dental work stations located in multiple rooms. In each room, a dentist is wearing an AR device (e.g., user interview 150) which is in local communication with a respective dental work station. Images sensors 112 in each room send their images to the server (i.e., 104) over network 110 optionally vial their respective local client terminals 108. Fused images and/or overlays are centrally generated by the server, and sent over the network to respective work stations for local presentation on respective AR devices.

Image sensor(s) 112 may transmit captured images (e.g., of the oral cavity of a dental patient) to computing environment 104, for example, via a direct connected (e.g., local bus and/or cable connection and/or short range wireless connection), and/or via network 110 and a network interface 122 of computing environment 104 (e.g., where sensor(s) 112 are connected via internet of things (IoT) technology and/or are located remotely from the computing environment 104). In another implementation, images captured by sensor(s) 112 are sent to computing environment 104 via client terminal 108 and/or server 118 which may be in local communication with sensor(s) 112.

Network interface 122 may be implemented as, for example, a wire connection (e.g., physical port), a wireless connection (e.g., antenna), a network interface card, a wireless interface to connect to a wireless network, a physical interface for connecting to a cable for network connectivity, and/or virtual interfaces (e.g., software interface, application programming interface (API), software development kit (SDK), virtual network connection, a virtual interface implemented in software, network communication software providing higher layers of network connectivity).

Processor(s) 102 of computing environment 104 may be hardware processors, which may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 102 may include a single processor, or multiple processors (homogenous or heterogeneous) arranged for parallel processing, as clusters and/or as one or more multi core processing devices.

Memory 106 stores code instructions 106A executable by hardware processor(s) 102. Exemplary memories 106 include a random access memory (RAM), read-only memory (ROM), a storage device, non-volatile memory, magnetic media, semiconductor memory devices, hard drive, removable storage, and optical media (e.g., DVD, CD-ROM). For example, memory 106 stores code 106A that execute one or more acts of the method described with reference to FIG. 2A and/or 2B.

Computing environment 104 may include a data storage device 120 for storing data, for example, a repository of data 120A that may store data as described herein, for example, CT images, 3D models, intraoral scan, and the like. Data storage device 120 may be implemented as, for example, a memory, a local hard-drive, a removable storage unit, an optical disk, a storage device, a virtual memory and/or as a remote server 118 and/or computing cloud (e.g., accessed over network 110).

Alternatively or additionally, computing environment 104 may be in communication (e.g., over a network 110) with one or more data storage devices 152 that may store data used herein, for example, CT images, 3D models, intraoral scan, and the like. Examples of data storage devices 152 include: data storage servers, cloud storage, external data storage devices, and the like.

Referring now back to FIG. 2A, at 202, sequential frames of an oral cavity of a subject are accessed.

The frames may be captured by one or more image sensors (e.g., camera) during a dental session of the subject. For example, the frames are captured by a camera which may be located on an AR device worn by a user (e.g., dentist) during the dental session. In another example, the camera may be located on another device, for example, a tripod, fixed to the ceiling and/or wall, attached to a maneuverable mechanical arm, and the like.

The terms frame and image may be used interchangeably.

The frames may be 2D images.

The frames may be presented, optionally within the AR device worn by the user. In another example, the frames may be presented on a display.

The frames serve as a basis within the GUI, where one or more visual elements may be presented as an overlay over the frames, and/or one or more fused frames may be created and presented within the GUI, as described herein.

At 204, a real-world location and/or angle of a real-world tool manipulated by a user is computed. The real-world tool may be a dental syringe that includes a needle, designed for injection of anesthesia. In another example, the real-world tool may be a dental drill.

The real-world location and/or angle of the dental syringe and/or the needle of the dental syringe may be dynamically computed in response to manipulations by the user, for example, displacement in 3D space, and/or change in angle. It is noted that change in rotation is not necessarily computed, based on the assumption that rotation along a long axis is not relevant since it does not impact the angle of the insertion of the needle into tissue.

The real-world location and/or angle of the real-world tool may be computed using different approaches. For example, in one approach, outputs of one or more pose sensors installed on the tool is analyzed to obtain the pose of the tool. In another example, predefined features of the real-world tool are extracted from the 2D frame. The predefined features may be matched to corresponding predefined features of a 3D model of the tool which may be set a baseline pose, such as aligned along one or more axes. The location and/or angle of the tool may be computed based on a translation from the predefined features extracted from the 2D frame to the predefined features of the 3D model. In yet another example, one or more predefined markers having a known baseline pose are connected to the tool. The predefine markers are detected on the 2D frame. The location and/or angle of the tool may be computed based on a translation from the pose of the markers extracted from the 2D frame to the known baseline pose.

The real world location of the jaw and/or other anatomical structures and/or anatomical landmarks (e.g., sites for injection of anesthesia) may be computed. The real world location of the jaw and/or other anatomical structures and/or anatomical landmarks may be computed based on a detection of the teeth in the image (e.g., by a detector model, a segmentation model, and/or by detecting intraoral markers placed on the teeth), and registering the teeth to a dental 3D imaging model of the teeth (e.g., acquired from the 3D image, such as a CT scan). The registration may be performed, for example, based on a simultaneous localization and mapping (SLAM) approach by solving the estimation of the pose of the camera on the AR device, and obtaining a MVP (model-view-projection) matrix which translates the location of the model (e.g., jaw) to the camera space. An analogous process may be computed for the tool, which may be detected (e.g., by a detector model, a segmentation model, and/or by detecting one or more features and/or markers), registering the tool with a corresponding 3D model (e.g., acquired by 3D scanning the tool during a pre-procedure calibrations process) and solving its MVP model view projection matrix with SLAM. The outcome of having each model (e.g., jaw, tool) at each frame and a corresponding updated model view matrix for each model, selected locations may be projected from a certain coordinate space of each of the model to the common camera coordinate space (e.g., denoting the real world). Distances may be measured within the common camera coordinate space, for example, the distance from the tip of the needle of the dental syringe to the anatomical landmark.

It is noted that the real-world location is optional, since other data for implementing features described herein may be extracted and/or computed based on the coordinate space of the camera (e.g., corresponding to the real world). The AR device's spatial awareness feature may be used to track the location and/or movement of the camera in the real world in order to remove estimated movement that may be a possible solutions in the SLAM but do not correlate with the boundaries of the spatial awareness of the AR device and as a result get better more optimal SLAM performance.

The location of the tool may be defined according to a tip of a needle of the dental syringe and/or according to a tip of a bur of the drill. The angle may be defined between the needle of the syringe (or the bur of the drill) and a plane parallel to an x-y plane of a coordinate system of the frames, at a pivot point defined by the tip of the needle (or bur).

The real-world location and/or angle of the tool may be computed within the coordinate system of the frames. Optionally, the frames are registered to the coordinate system, and the real-world location and/or angle of the tool is computed relative to the coordinate system. The frames may be registered to the coordinate system by defining the coordinate system relative to a dental 3D imaging model of the subject that includes anatomical features relates to the oral cavity, for example, a CT scan and/or MRI scan. The coordinate system may represent real-world measurements based on the dental 3D imaging model. The location and/or angle of the tool may be defined within the coordinate system defined based on the dental 3D imaging model.

In some embodiments 204 is omitted. For example, the dental syringe may be guided for injection of the anesthetic agent into the dental-related anatomical structure presented within the GUI, without computing the location and/or angle of the real world dental syringe. The dentist may guide the dental syringe based on the location of the dental-related anatomical structure presented within the GUI without additional automatic guidance assistance for the dental syringe.

At 220, the GUI may be dynamically updated based on one or more features described with reference to 202-218.

For clarity and simplicity of explanation, the update of the GUI is initially described with reference to 204 or without 204. Additional possible updates of the GUI are described with reference to other features below.

The GUI may be dynamically updated according to the current pose of the camera (or other image sensor) capturing the sequential frames of the oral cavity of the subject, which are used to create the fused frames depicting the location of the dental-related anatomical structure overlaid over the sequential frames. For example, the image sensor(s) (e.g., camera) is located on a virtual reality headset worn by the dentist. The visual indication indicating the location of the foramen (i.e., the dental-related anatomical structure) is dynamically updated on the fused image depicted in the GUI as the dentist moves their head, for continuously maintaining the dentist's ability to visualize the location from different poses.

The GUI may be dynamically updated according to the computed real-world location and/or angle of the tool. The real-world location and/or angle of the tool correspond to a virtual location and/or virtual angle defining a virtual vector. The virtual vector may be defined as directly corresponding to the real-world location and/or angle of the tool. Alternatively, the virtual vector may be defined at an offset of the virtual location relative to the real-world location of the real-world tool. For example, the virtual vector is displaced 2 cm to the left of the real-world location of the tool along the x-axis of the coordinate system.

The virtual vector may be presented as an overlay overlaid on the sequential frames, where the virtual location and/or virtual angle are dynamically updated, corresponding to the real-world location and/or angle of the real-world tool which may be dynamically adapted by manipulations of the use.

The virtual vector depicted in the GUI may be dynamically updated according to dynamic manipulations of the tool by the user, enabling the user to select a desired location and/or angle, such as for drilling into the jaw of the subject for insertion of a dental implant.

At 222, one of more features described with reference to 202-220 may be iterated. During iterations, different features may be implemented, as described herein. The features are now described, without necessarily being limited to a specific sequence and/or order. The numbering of the blocks 202-220 representing features, are for convenience only, without defining a specific sequence and/or order. Different sequences and/or arrangements may be implemented.

Different exemplary flows are now described. The flows are not necessarily limiting, and may be in different sequences and/or orders. The flows may represent an iteration. After each flow, the GUI may be updated accordingly, as described with reference to 220. Another iteration may follow, as described with reference to 222. During each iteration, visual features described with respect to different flows may be added for presentation within the GUI or removed from the GUI (when previously presented), for example, during a first iteration dental-related anatomical structure (e.g., as described with reference to 208) is depicted, during a second iteration an overlay (e.g., as described with reference to 212) is depicted simultaneously with the dental-related anatomical structure, and during a third flow a dental 3D visual model (e.g., as described with reference to 216) is depicted simultaneously with the dental-related anatomical structure and with the 3D virtual model. Different tools may be used during different iterations. For example, in a first set of iterations, the tool is a dental syringe for injection of anesthesia. In a second set of iterations, the tool is a drill for drilling within tissues anesthetized by the injection.

In one exemplary flow, feature 218 is implemented during an iteration.

At 218, the virtual location and/or virtual angle of the virtual vector may be fixed with respect to the subject. The virtual vector may be fixed with respect to the coordinate system described herein, such that upon changes to the pose of the camera capturing the frames (e.g., as described with reference to 202), the GUI is updated by updating the overlay for indicating the virtual vector at the same fixed location and/or angle.

Once the virtual location and/or virtual angle of the virtual vector is fixed, the fixed virtual location and/or fixed virtual angle is independent of the real-world location and/or angle of the real-world tool.

Alternatively, the GUI or another GUI is used for selecting the location of the target virtual vector, such as the dental-related anatomical structure, for example, the mental foramen and/or mandibular foramen. The GUI or another GUI may be used for selecting the angle of the target virtual vector at the location corresponding to the dental-related anatomical structure, for example, representing the optimal and/or easiest angle at which to inject. The target virtual vector may be adaptable via the GUI or another GUI, and fixed at the target angle and/or target location according to a user input entered via the GUI or the other GUI. Alternatively, the target virtual vector may be automatically detected and/or segmented from the dental 3D imaging model, for example, using a segmentation model and/or detector model, as described herein.

The fixing may be set in response to an input from the user, which may be received via the GUI and/or another device. For example, the user may say a defined phrase into a microphone to indicate the fixing, for example, "fix it". In another example, the user or an assistant may press an icon on the GUI presented on a display.

Optionally, the fixing is done in two steps. In a first step, the location of the virtual vector is fixed. Once the location is fixed, the angle of the virtual vector may be adapted while retaining its fixed location according to manipulations of the tool. The angle is then fixed with respect to the fixed location of the virtual vector.

Optionally, a 3D virtual model of a dental implant, for example as described with reference to 212 and/or 214, is depicted at a location and angle corresponding to the fixed location and angle. Alternatively, first the 3D virtual model of the dental implant is generated and/or adapted, and then the 3D virtual model of the dental implant is fixed.

Optionally, in subsequent iterations following the fixing of the 3D virtual model of a first dental implant, the virtual angle and/or virtual location of a simultaneously presented second virtual vector, is fixed. The second virtual vector may be for planning insertion of a second dental implant with respect to the 3D virtual model of the first dental implant.

A fixed virtual vector may be released (e.g., in response to an input by a user) and re-fixed at a different location and/or angle.

Once the virtual vector has been fixed (e.g., the user is pleased with the location and/or angle), the fixed virtual vector may be used for guiding the needle insertion (for delivering anesthesia) and/or for guiding the drilling procedure. The GUI may be updated accordingly. An exemplary approach for updating the GUI for guiding the needle insertion and/or drilling procedure based on the fixed virtual vector is described, for example, with reference to FIG. 2B.

Another exemplary flow based on features 206-210 is now described. It is to be understood that one or more features described with reference to 218-222 may be implemented following the described flow.

At 206, one or more dental-related anatomical structures of the subject may be selected, optionally by the user.

The dental-related anatomical structures may be selected using an input mechanism, for example, by analyzing speech of the user (e.g., the user saying "display jawbone", or "show me the nerves"), pressing an icon on a screen, manipulating another tool, and the like.

The dental-related anatomical structure(s) may include an internal anatomical structure located, such as below an intraoral surface of the subject. Examples of dental-related anatomical structures include roots of teeth, jawbone, one or more nerves, and one or more foramens (e.g., mental foramen, mandibular foramen). The dental-related anatomical structure(s) may be significant for injection and/or drilling and/or insertion of the implant. For example, the dental-related anatomical structures may represent anatomical structures which are to be avoided during injection and/or drilling such as nerves, and/or may represent structures to be injected into and/or drilled into such as the foramen(s) and/or jawbone.

The dental-related anatomical structure(s) may include one or more targets for injection of anesthesia by the dental syringe, for example, mental foramen and/or mandibular foramen.

There may be multiple different dental-related anatomical structures which may be simultaneously presented within the GUI, such as different overlay layers, for example, jaw bone and nerves.

The dental-related anatomical structure may be segmented from the dental 3D imaging model which may be registered to the sequential frames. The dental 3D imaging model may be created based on a 3D scan of the oral cavity of the subject, which may be captured pre-procedure, for example, a CT scan and/or MRI scan. One or more dental-related anatomical structures may be identified within the 3D scan, for example, automatically by one or more detector models and/or manually by a user.

At 208, the selected dental-related anatomical structure(s) may be presented within the GUI presenting the images of the oral cavity (e.g., captured by the camera).

The dental-related anatomical structure(s) may be registered to the images of the oral cavity, and presented according to the registration, such as within a common coordinate system.

Optionally, the dental-related anatomical structures are presented within the GUI in one or more fused frames. The fused frames represent a merger of the sequential frames and a segmentation of the dental-related anatomical structure of the subject.

The fused frames may be created as follows: The frame may be registered to the dental 3D imaging model. The registration may be performed by aligning features of the frame with corresponding features of the dental 3D imaging model. The features used for alignment may be, for example, special markers placed on teeth of the user that are present during the 3D scan used to create the dental 3D imaging model, and during the dental procedure while the frames are being captured. In another example, the features for alignment may be a segmentation of teeth. A segmentation of the dental-related anatomical structure segmented from the dental 3D imaging model may be accessed. The fused frame may be created by merging the frame with the segmentation of the dental-related anatomical structure, while maintain the registration between the frame and the dental 3D imaging model.

Additional details of exemplary approaches for creating fused frames are described, for example, with reference to International Patent Application Publication No. WO2022/190105, entitled "ENHANCING DENTAL VIDEO TO CT MODEL REGISTRATION AND AUGMENTED REALITY AIDED DENTAL TREATMENT", filed on Mar. 10, 2022, and assigned to the same Assignee as the present application, the contents of which are incorporated herein by reference in its entirety.

The overlay of the virtual vector may be presented over each fused frame. The virtual vector may be depicted with respect to the segmentation of the dental-related anatomical structure(s) presented in the fused frame. When the virtual vector is positioned at least partially below a surface of the oral cavity, such as at least partially within tissues of the jaw, the virtual vector may be visually depicted at least partially penetrating the tissue. For example, different intensity of pixels and/or different patterns may be used for of portions of the virtual vector located "outside" tissues and for portions of the virtual vector located "inside" tissues. This may enable the user to visualize the drilling route from outside the tissues, inside tissues, and in relation to the internal dental-related anatomical structures.

At 210, a distance between the virtual vector and one or more of the dental-related anatomical structures may be computed. The distance may be dynamically computed in response to adaptation of the virtual vector in response to manipulations of the tool by the user.

An indication (e.g., alert) may be generated according to the distance. Optionally, the indication is generated when the distance is below a threshold indicating risk to the nearby dental-related anatomical structure. For example, when the virtual vector is too close to the nerve. Alternatively or additionally, the indication is generated when the distance is above a threshold indicating a safe margin from the nearby dental-related anatomical structure. For example, when the virtual vector is a safe distance away from the nerve. The indication may be, for example, a message, a change in color of the virtual vector, a pop-up visual element presented on the GUI, and the like.

With respect to feature 220, the GUI may be dynamically updated for presenting one or more of: the fused frames depicting the dental-related anatomical structure(s), the virtual vector within the fused frame and with respect to the dental-related anatomical structure(s), a presentation of the distance, and the generated indication of indicating whether the virtual vector is within a safe margin and/or poses a risk according to the distance.

Another exemplary flow based on features 212-214 is now described. It is to be understood that one or more features described with reference to 218-222 may be implemented following the described flow.

At 212, another overlay (which may be included in the current overlay and/or as a separate overlay) may be generated.

Optionally, the other overlay may be a visual indication of a predicted region of tissue that will become anesthetized in response to injection of anesthesia when the needle of the dental syringe being manipulated by the user is positioned at a certain physical angle and/or physical location. The visual indication may be generated in response to a user input indicating amount of anesthesia being injected at the corresponding physical and/or physical location of the dental syringe.

Alternatively or additionally, the other overlay includes a 3D virtual model of a dental implant for implantation along the virtual vector may be generated.

The 3D virtual model of the dental implant may be positioned at the virtual location of the virtual vector, at an angle defined by the virtual angle.

The 3D virtual model is presented within the GUI, over the sequential frames that may include the virtual vector. The 3D virtual model may be presented within the GUI simultaneously with other depicted visual features, for example, the dental-related anatomical structure(s) described herein and/or the dental 3D visual model described herein.

The 3D virtual model of the dental implant may represent the implant portion that is inserted into the teeth and/or the dental prosthesis that connects to the implant, such as the crown.

The 3D virtual model of the dental implant positioned along the virtual vector, as depicted in the GUI, may be dynamically updated according to the corresponding physical angle and/or physical location of the tool manipulated by the user.

Alternatively or additionally, the other overlay is of the target virtual vector for planning the angle for insertion of the needle of the dental syringe. The target virtual vector may be manually selected and/or automatically generated, as described herein.

At 214, the overlay may be dynamically adapted.

Optionally, the overlay is dynamically adapted. A size and/or shape of the visual indication may be dynamically adapted according to the amount of injected anesthesia and/or according to dynamic manipulation of the pose of the needle. The visual indication may be, for example, a color coding of the tissue and/or bolding of the tissue and/or translucent overlay over the tissue, which is predicted to be anesthetized. This may help the user (e.g., dentist) determine that the tissue which is to be operated on (e.g., tooth being drilled into) is included in the tissue predicted to be anesthetized defined by the visual indication. The region of tissue predicted to become anesthetized may be computed, for example, based on models of tissue and/or a machine learning model, and the like. The region of tissue predicted to become anesthetized may assist the user in helping to determine, for example, the amount of anesthesia needed to anesthetize target tissue, the pose of the needle to anesthetize target tissue, and/or whether the target tissue will even become properly anesthetized when injecting from a certain pose. For example, some patients may have anatomical variations of location of their nerves such that injection at standard injection sites will not successfully anesthetized the target tissue.

Alternatively or additionally, when the overlay depicts the target virtual vector for guiding insertion of the needle of the dental syringe, the location and/or angle of the target virtual vector may be adapted. When the desired location and/or angle is found (e.g., manually and/or automatically), the target location and/or target angle may be fixed, for example, as described with reference to 218.

Alternatively or additionally, the 3D virtual model of the dental implant may be dynamically adapted.

One or more parameters of the 3D virtual model of the dental implant may be dynamically adapted.

Examples of parameters that may be adapted include size (e.g., length and/or diameter and/or width and/or height), shape, and/or type (e.g., manufacturer, model).

The adaption may be in response to input from a user, for example, selection via voice activation, manipulation of a tool, and/or by selection of an icon on a display. Alternatively, the adaptation may be automatic, for example, a code (e.g., process, machine learning model) may automatically select parameters of the dental implant according to the location of the virtual vector and/or according to other nearby teeth. For example, the size of the dental implant is selected according to the location of the nerve, and the type of the dental implant is selected to look like the tooth that is being replaced.

Another exemplary flow based on feature 216 is now described. It is to be understood that one or more features described with reference to 218-222 may be implemented following the described flow.

At 216, a dental 3D visual model of the subject may be depicted within the GUI, optionally as an overlay over the subject's teeth and/or jaw. The dental 3D visual model may be created by an intraoral scanner capturing images at the visual light spectrum.

The dental 3D visual model may be simultaneously presented within the GUI with one or more of the dental-related anatomical structures. The dental-related anatomical structure(s) may include an internal anatomical structure located below an intraoral surface of the subject, which is simultaneously presented registered with the dental 3D visual model. For example, the dental 3D visual model depicts the subject's teeth and/or jaw, and simultaneously presented dental-related anatomical structures include nerve(s) and/or foramen(s).

The user may select to include or exclude the dental 3D visual model, for example, by voice activation, using a tool, and/or selecting an icon on a display.

The virtual vector may be presented with respect to the dental 3D visual model. When the virtual vector is positioned at least partially below a surface of the dental 3D visual model, the virtual vector may be visually depicted at least partially penetrating the dental 3D visual model. For example, different intensity of pixels and/or different patterns may be used for of portions of the virtual vector located "outside" the dental 3D visual model and for portions of the virtual vector located "inside" the dental 3D visual model. This may enable the user to visualize the injection route and/or the drilling route from outside the tissues, inside tissues, and in relation to anatomical structures of the dental 3D visual model.

The location and/or angle of the virtual vector with respect to the dental 3D visual model may be dynamically updated in response to manipulations of the tool by the user.

The dental 3D visual model may be presented as a second overlay on the sequential frames, and/or as part of the current overlay.

The dental 3D visual model may be presented within the GUI according to a registration between the dental 3D visual model, the dental 3D imaging model, and the sequential frames. The virtual vector may be overlaid on the dental 3D visual model and the sequential frames according to a corresponding physical angle and/or physical location of the tool manipulated by the user.

The dental 3D visual model may be presented within the GUI using the following exemplary approach. The dental 3D visual model may be registered to the dental 3D imaging model described herein (e.g., generated based on a pre-procedure 3D image such as a CT and/or MRI scan). The registration may be done, for example, matching intraoral markers located on teeth of the subject depicted in the dental 3D visual model to intraoral markers in the dental 3D imaging model, and/or by matching a teeth segmented from the dental 3D visual model to the same corresponding teeth segmented from the dental 3D imaging model. The frame may be registered to the dental 3D visual model according to the intraoral markers and/or according to the teeth segmented from the 2D frame. The frame may be registered to the dental 3D imaging model according to the registration of the frame to the dental 3D visual model, and/or according to the registration of the dental 3D visual model to the dental 3D imaging model. A fused frame (which may be another fused frame different than the fused frame described with reference to 208, or in addition to the fused frame described with reference to 208) may be created by merging the frame with a corresponding portion of the registered dental 3D visual model. A second overlay (which may be different than the current overlay, or part of the current overlay) of the virtual angle and/or the virtual location of the virtual vector on the fused frame may be adapted according to a corresponding physical angle and/or physical location of the tool manipulated by the user.

It is to be understood that reference to a drill made with respect to FIGS. 3-7 is exemplary and not necessarily limiting, for example, a dental syringe may be substituted for the drill described with reference to FIGS. 3-7.

Referring now back to FIG. 3, GUI 302 depicts virtual vector 304 overlaid on frame 308 depicting a mouth of a subject captured by a camera. GUI 302 may be presented within an AR device worn as a headset by a user, optionally a dentist, for planning insertion of a dental implant according to virtual vector 304, as described herein.

GUI 302 further depicts a jawbone (i.e., dental-related anatomical structure) 306.

Virtual vector 304 is positioned relative to jawbone 306, for indicating the location and/or angle where the dental implant is to be positioned.

Jawbone 306 may be registered to frame 308 based on markers 312 placed on the teeth of the subject, and/or segmentation of the teeth of the subject, as described herein.

One or more visual markers 310 may be presented with respect to virtual vector 304, for example, concentric circles. A tip of virtual vector 304 may be positioned within a center of concentric circles 310. Virtual vector 304 may represent a normal of a plane of concentric circles 310. Concentric circles 310 may help visualize the location and/or angle of virtual vector 304.

GUI 402 depicts the 3D virtual model of dental implant 406 positioned with respect to virtual vector 404 overlaid on a frame 408 depicting a mouth of a subject captured by a camera. A top portion 404A of virtual vector 404 depicted as external to dental implant 406 is shown with pixels of a higher intensity. A bottom portion 404B of virtual vector 404 depicted as internal to dental implant 406 is shown with pixels of a lower intensity.

Referring now back to FIG. 5, GUI 502 depicts virtual vector 504 positioned within dental 3D visual model 506 overlaid on frame 508 depicting a mouth of a subject captured by a camera. Dental 3D visual model 506 may be registered to frame 508 as described herein.

Referring now back to FIG. 6, GUI 602 depicts virtual vector 604 positioned relative to nerves 606A and 606B (i.e., another dental-related anatomical structure) overlaid on frame 608. GUI 602 may depict where a tip 610 of virtual vector 604 is relative to nerve 606A, for example, whether tip 610 is too close to nerve 606A, whether tip 610 penetrates nerve 606A, whether tip 610 is a safe distance away from nerve 606A, and the like.

Referring now back to FIG. 7, GUI 702 depicts virtual vector 704 positioned relative to teeth roots 706 (i.e., the yet another dental-related anatomical structure) overlaid on frame 708. 7UI 602 may depict where virtual vector 704 is relative to teeth roots 706, for example, whether too close, or a safe distance away.

Referring now back to FIG. 8, exemplary dental-related anatomical structures of the subject are presented. The exemplary dental-related anatomical structures include a jawbone 802 (optionally including teeth) and/or one or more nerves 804. The dental-related anatomical structures may be segmented from 3D anatomical imaging data, for example, from a CT scan, for example, as described herein.

Referring now back to FIG. 9, GUI 902 presents fused image 904, created from a visual image 908 captured by a camera depicting the subject's oral cavity, overlaid with registered jawbone 802 and nerves 804 (as described with and shown with reference to FIG. 8), and dental 3D visual model 906 depicting the subject's gums and teeth (optionally generated based on data captured by an intraoral scanner). An anatomical landmark 910 of the mental foramen is indicated with respect to jawbone 802.

Referring now back to FIG. 10, GUI 1002 depicts fused image 904 (described and/or shown with respect to FIG. 9) with an overlay of two or more concentric circles 1004 for guiding injection via a dental syringe 1006, as described herein. Concentric circles 1004 are shown centered on the mandibular foramen. A target virtual vector may be presented as a line parallel to a direction for insertion of a needle of dental syringe 1006 and as concentric circles 1004 arranged along a plane tangent to a surface of the location of the dental-related anatomical structure, for example, the mental foramen. The line may be normal to the plane.

Referring now back to FIG. 2B, at 202B, a target vector is presented within a GUI, over a frame of an oral cavity of a subject, optionally as an overlay.

The frame may be one of a sequence of frames. The frames may be captured by one or more image sensors (e.g., camera) during a dental session of the subject. For example, the frames are captured by a camera which may be located on an AR device worn by a user (e.g., dentist) during the dental session. In another example, the camera may be located on another device, for example, a tripod, fixed to the ceiling and/or wall, attached to a maneuverable mechanical arm, and the like.

The terms frame and image may be used interchangeably.

The frames may be 2D images.

The GUI, including the frames overlaid with one or more visual elements described herein, may be presented within the AR device worn by the user. In another example, the frames may be presented on a display.

The target virtual vector may represent a target vector including a target location and/or a target angle for injection by a real-world needs of a real-word dental syringe, and/or for drilling by a real-world bur of a real-world drill for insertion of a dental implant.

The target virtual vector may be presented with respect to a 3D virtual model of a dental implant. For example, the user may select to present the 3D virtual model of the dental implant according to the target vector, such as to virtually illustrate how the dental implant is presented to look after being implanted at the location corresponding to the target virtual vector. The 3D virtual model of the dental implant may represent the implant portion that is inserted into the teeth and/or the dental prosthesis that connects to the implant, such as the crown.

The target virtual vector may be a virtual vector that is fixed after being manipulated in response to a real-world location and/or a real-world angle of a tool (optionally the real-world syringe with needle and/or the real-world drill with bur) being manipulated by a user. Exemplary details of creating and/or updating a GUI, optionally presented within the AR device, for adapting a virtual location and/or virtual angle of the virtual vector, and defining the target virtual vector by fixing the virtual vector at the target virtual location and/or target virtual angle corresponding to the real-world location and/or real-world angle of the syringe and/or drill within the oral cavity of the subject, are described, for example, with reference FIG. 2A.

Alternatively or additionally, the target virtual vector may be automatically computed based on anatomical landmarks identified within the oral cavity and a set of rules applied to distances to the anatomical landmarks. The anatomical landmarks may be automatically detected as follows: the frame(s) may be registered to a dental 3D imaging model. The dental 3D imaging model may be created based on a 3D scan of the oral cavity of the subject, which may be captured pre-procedure, for example, a CT scan and/or MRI scan. The anatomical landmarks may be identified within the 3D scan and/or the dental 3D imaging model, for example, automatically by one or more detector models and/or manually by a user. The anatomical landmarks may include structures below a surface of the oral cavity, which cannot be seen visually by a human looking into the subject's mouth, for example, nerves and/or foramen(s). The registration enables mapping the locations of the anatomical landmarks identified on the dental 3D imaging model to the 2D frame. The 2D frame may be registered to the dental 3D imaging model, for example, by substantially matching a pattern of intraoral markers which may be positioned on the teeth of the subject during the 3D scan and during capture of the frames. In another example, teeth of the subject may be segmented from the 2D frame and from the dental 3D imaging model, and registration is performed between the segmented teeth.

Additional exemplary details of registration between frames and the dental 3D imaging model are described, for example, with reference to International Patent Application Publication No. WO2022/190105, entitled "ENHANCING DENTAL VIDEO TO CT MODEL REGISTRATION AND AUGMENTED REALITY AIDED DENTAL TREATMENT", filed on Mar. 10, 2022, incorporated herein by reference in its entirety.

The anatomical landmarks may include structures to avoid injecting into and/or to avoid drilling into, for example, nerves and/or tooth roots. The distance from the target virtual vector to the structures to avoid may be computed. The set of rules may define a threshold indicating a minimal distance to maintain between the needle during injecting and/or the bur during drilling, and the structure to avoid. Alternatively or additionally, the anatomical landmarks may include locations for injection and/or relative to where the implant is to be positioned, for example, the jawbone (e.g., anatomical locations of the jawbone), and/or specific teeth, and/or foramen(s). The distances and/or directions may be from the anatomical landmarks. The set of rules may define where to inject and/or where to drill using the distances and/or directions. For example, distance and/or location from arc of the jaw, between two specific teeth, and/or specific foramen(s).

The target virtual vector is presented as an overlay on the frame, within the GUI. The target virtual vector may be presented as a line. The line is parallel to a direction for injection and/or for drilling for insertion of the dental implant. The length of the line may correspond to a length of the needle and/or bur, and/or may be selected to be visually clear to the user, such as long enough to have one portion within tissue and another portion external to tissue. A region (e.g., center) of the line may correspond to an initial location for injection and/or drilling. The target virtual vector may include multiple other visual elements arranged along plane, optionally two or more concentric circles. The line may be normal to the plane of the visual elements. The region of the line indicating the initial location for injection and/or drilling may be positioned at a center of the visual elements (e.g., concentric circle). The center of the visual elements may correspond to the initial location for injection and/or drilling. The line may be positioned relative to the visual elements such that one portion of the line below the region is depicted within tissue and the other portion of the line above the region is depicted external to the tissue.

At 204B, a real-world location and/or real-world angle of the real-world needle of the syringe and/or the real-world bur of the drill, during manipulations by a user, is monitored and/or computed.

It is to be understood that other real-world structures corresponding to the needle and/or syringe and/or bur and/or drill may be monitored, and a mapping may be used to map to the needle and/or syringe and/or bur and/or drill.

The real-world location and/or angle may be dynamically computed in response to manipulations by the user, for example, displacement in 3D space, and/or change in angle. It is noted that change in rotation is not necessarily computed, based on the assumption that the drill bit rotates for drilling, and determination of rotation is not relevant.

The drill may be for use by a user (e.g., dentist) for drilling into the jaw, for inserting the dental implant. The syringe may be for user by the user (e.g., dentist) for injection into the jaw, for anesthetizing tissue. The location may be defined according to a tip of the bur of the drill and/or a tip of the needle of the syringe. The angle may be defined between the needle of the syringe (or the bur of the drill) and a plane parallel to an x-y plane of a coordinate system of the frames, at a pivot point defined by the tip of the needle (or the bur).

The real-world location and/or angle may be computed within the coordinate system of the frames. The coordinate system may be common to the target virtual vector and the needle of the syringe (or the bur of the drill).

The real-world location and/or angle of the real-world tool may be computed using different approaches. For example, in one approach, outputs of one or more pose sensors installed on the tool are analyzed to obtain the pose of the tool. In another example, predefined features of the real-world tool are extracted from the 2D frame. The predefined features may be matched to corresponding predefined features of a 3D model of the tool which may be set a baseline pose, such as aligned along one or more axes. The location and/or angle of the tool may be computed based on a translation from the predefined features extracted from the 2D frame to the predefined features of the 3D model. In yet another example, one or more predefined markers having a known baseline pose are connected to the tool. The predefine markers are detected on the 2D frame. The location and/or angle of the tool may be computed based on a translation from the pose of the markers extracted from the 2D frame to the known baseline pose.

The real world location of the jaw and/or anatomical landmarks and/or other anatomical structures may be computed. The real world location of the jaw and/or anatomical landmarks and/or other anatomical structures may be computed based on a detection of the teeth in the image (e.g., by a detector model, a segmentation model, and/or by detecting intraoral markers placed on the teeth), and registering the teeth to a dental 3D imaging model of the teeth (e.g., acquired from the 3D image, such as a CT scan). The registration may be performed, for example, based on a simultaneous localization and mapping (SLAM) approach by solving the estimation of the pose of the camera on the AR device, and obtaining a MVP (model-view-projection) matrix which translates the location of the model (e.g., jaw) to the camera space. An analogous may be computed for the syringe and/or drill, which may be detected (e.g., by a detector model, a segmentation model, and/or by detecting one or more features and/or markers), registering the syringe and/or drill with a corresponding 3D model (e.g., acquired by 3D scanning the drill during a pre-procedure calibrations process) and solving its MVP model view projection matrix with SLAM. The outcome of having each model (e.g., jaw, syringe, drill) at each frame and a corresponding updated model view matrix for each model, selected locations may be projected from a certain coordinate space of each of the model to the common camera coordinate space (e.g., denoting the real world). Distances may be measured within the common camera coordinate space, for example, the distance from the tip of the bur of the drill to the nerve, or distance from the tip of the needle of the syringe to a foramen.

It is noted that the real-world location is optional, since other data for implementing features described herein may be extracted and/or computed based on the coordinate space of the camera (e.g., corresponding to the real world). The AR device's spatial awareness feature may be used to track the location and/or movement of the camera in the real world in order to remove estimated movement that may be a possible solutions in the SLAM but do not correlate with the boundaries of the spatial awareness of the AR device and as a result get better more optimal SLAM performance.

Optionally, the frames are registered to the coordinate system, and the real-world location and/or angle of the tool is computed relative to the coordinate system. The frames may be registered to the coordinate system by defining the coordinate system relative to the dental 3D imaging model of the subject that includes anatomical features relates to the oral cavity, for example, a CT scan and/or MRI scan. The coordinate system may represent real-world measurements based on the dental 3D imaging model. The location and/or angle of the tool may be defined within the coordinate system defined based on the dental 3D imaging model.

At 206B, a current virtual vector including a virtual location and/or virtual angle is computed.

The current virtual vector corresponds to a current value of the monitored and/or computed real-world location and/or real-time angle of the real-world needle of the syringe and/or the real-world bur of the drill.

The current virtual vector may be defined within the coordinate system in which the target virtual vector is defined. The virtual location and/or virtual angle of the current virtual vector within the coordinate system corresponds to the real-world location and/or real-world angle of the needle of the syringe and/or the bur of the drill.

The current virtual vector is presented as an overlay on the frame, within the GUI. The overlay may be the same as the overlay presenting the target virtual vector, or may be a different overlay than the overlay presenting the target virtual vector. The current virtual vector may be simultaneously presented with the target virtual vector. The current virtual vector may be presented as a line. The line may be parallel to a long axis of the bur. The length of the line may correspond to a length of the needle and/or bur, and/or may be selected to be visually clear to the user, such as long enough to have one portion within tissue and another portion external to tissue. The length of the line indicating the current virtual vector may substantially match the length of the line denoting the target virtual vector. A region (e.g., center) of the line may correspond to a tip of the needle and/or the bur. The current virtual vector may include multiple other visual elements arranged along plane, optionally two or more concentric circles. The line may be normal to the plane of the visual elements. The region of the line indicating the tip of the needle and/or bur may be positioned at a center of the visual elements (e.g., concentric circle). The center of the visual elements may correspond to the tip of the needle and/or bur. The line may be positioned relative to the visual elements such that one portion of the line below the region is depicted within tissue and the other portion of the line above the region is depicted external to the tissue.

At 208B, a misalignment between the current virtual vector and the target virtual vector is computed and/or tracked. The misalignment may include one or more of the following:

Misalignment in terms of location between the current virtual vector and the target virtual vector. The misalignment may be computed between the tip of the current virtual vector and the tip of the target virtual vector. The misalignment may be defined along three axes, such as displacement along a 2D plane defined by the x-axis and y-axis, and/or an elevation displacement along a z-axis. The misalignment may be for the needle of the dental syringe and the target virtual vector, for example, when the angle of the needle is not parallel to the angle of the line of the target virtual vector indicating that the angle that the needle is about to be inserted into the subject (or which has already been inserted into the subject) is different from the desired and/or planned angle.

Misalignment in terms of angle, between the angle of the current virtual vector and the angle of the target virtual vector. Each angle may be defined between the line and a plane that represents a tangent to the surface of the tissue that intersects the line, representing the initial location for drilling.

Misalignment in terms of depth between the location of the current virtual vector corresponding to a tip of the needle and/or bur (e.g., distal tip of the line indicating the current virtual vector), and the initial location for injection and/or drilling (e.g., surface of the jawbone) defined by the target virtual vector. Alternatively the misalignment may be between the location of the current virtual vector corresponding to the tip of the needle and/or the bur and a portion of the target virtual vector indicating maximum depth for drilling.

The misalignment may be for the current virtual vector relative to the target virtual vector. The misalignment may indicate how to adapt the current virtual vector for alignment with the target virtual vector.

Alternatively, in embodiments in which the location and/or angle of the dental syringe is not being dynamically tracked, no misalignment is computed. In such embodiments, the GUI may be updated to depict the location of the dental-related anatomical structure and/or the angle of the target virtual vector, indication the location and/or angle insertion of the needle of the dental implant according to the pose of the camera (e.g., located on the head of the user), without being based on the current location and/or angle of the dental syringe.

An indication of the misalignment may be presented within the GUI as an overlay over the frame. For example, distance to move along the x, y, and/or z axes to align the tip of the needle and/or bur with the target virtual vector, and/or amount of angular rotation to perform to align the long axis of the needle and/or the bur with the line representing the target virtual vector and/or amount of depth (e.g., from the initial location of injection and/or drilling and/or to the maximum depth).

It is noted that alignment may be determined as being achieve when the current virtual vector and the target virtual vector are aligned along the x-axis and/or y-axis, where location along the z-axis is at the level from the initial location for drilling and below. I.e., depth may be variable while alignment is maintained, indicating injection and/or drilling is in progress at the target location and/or target angle.

At 210B, the GUI is dynamically updated in response to the misalignment. Alternatively, in embodiments in which the location and/or angle of the dental syringe is not monitored, no misalignment is computed.

Optionally, an indication for reducing the misalignment for obtaining an alignment between the current virtual vector and the target virtual vector is presented within the GUI. The indication for reducing the misalignment may be dynamically updated according to the misalignment dynamically computed based on real-time values of the current virtual vector.

The indication for reducing the misalignment may be for adapting spatial coordinates of the current virtual vector to match the spatial coordinates of the target virtual vector, and/or for adapting the angle of the current virtual vector to substantially match the angle of the target virtual vector. The adaptation may be performed by the user, by adjusting their hand to move and/or orient the drill.

The indication may be, for example, a presentation of offset of the current virtual vector from the target virtual vector. The offset may be presented as numerical values and/or text. The offset may indicate the distance to displace the current virtual vector to align with the target virtual vector, optionally along the x-axis and/or y-axis and/or z-axis. The distance may be, for example, in pixels, in millimeters, or other values. The offset may indicate the amount of angular rotation (optionally using the point of the needle and/or the bur as the pivot point) to align the current virtual vector with the target virtual vector. The offset may be visually coded (e.g., color, pattern, bolding) to indicate directions, such as up-down, left-right, forward-backwards, tilt up-down.

When misaligned, the current virtual vector and the target virtual vector are presented as two distinct lines and/or visual elements. The lines and/or visual elements may overlap according to the amount of misalignment. When aligned, the current virtual vector and the target vector substantially overlap each other, appearing as a single vector. It is noted that the alignment presented within the GUI may not be 100% even when the current virtual vector and the target virtual vector may be determined to be aligned, due for example, to natural small movements of the hand of the user holding the syringe and/or drill, and/or resolution of the vectors. The alignment may be determined within a range, for example, about 1 millimeter or about 2 millimeters, and/or within about 5 degrees or 10 degrees.

Alternatively or additionally, the indication for reducing misalignment may be presented as a marker presented with respect to the visual elements and/or line representing the current virtual vector. The marker may be designed to visually indicate the adaption for alignment with the target visual vector. The visual marker may be different than the numerical values and/or text. For example, a location and/or shape and/or color of the marker is selected with respect to the visual elements and/or line, for indicating a direction and/or amount and/or angle for adapting the current virtual vector for alignment with the target virtual vector. For example, in the implementation of the visual elements as two or more concentric circles, the marker may be presented as a thickened and/or colored arc portion of the concentric circles. For example, the marker may be one or more of: a color, a certain arc length, and a specific concentric circle of the multiple concentric circles. The location of the marker along the circle may indicate the direction to displace the current visual vector for alignment with the target visual vector. The color and/or arc length of the marker may indicate, for example, amount of displacement, such as large, medium, large, where the color and/or arc length changes as the misalignment is reduced. The marker may be positioned along a specific concentric circle of the multiple concentric circles according to a magnitude of the misalignment between the current virtual vector and the target virtual vector. For example, positioning the marker at a relatively outer concentric circle may indicate a relatively larger magnitude for reducing misalignment. Positioning the marker at a relatively inner concentric circle may indicate a relatively smaller magnitude for reducing misalignment.

Alternatively or additionally, the indication for reducing misalignment may be presented as an adaptation vector indicating a magnitude and/or direction for adapting the location of the current virtual vector for alignment with a location of the target virtual vector. The adaption vector may be presented as a line connecting a position of the current virtual vector optionally corresponding to a tip of the needle and/or bur, and a position of the target virtual vector optionally corresponding to an initial location for injection and/or drilling. The color and/or pattern of the line indicating the adaptation vector may be different than the color and/or pattern of the lines representing the current virtual vector and/or the target virtual vector. The line may visually represent a rubber band, which dynamically expands when the misalignment increases, and dynamically contracts when the misalignment decreases.

Alternatively or additionally, the indication may be of depth relative to the target virtual location, optionally depth of the tip of the needle and/or bur relative to the initial location for injection and/or drilling which may be located at the surface of the jaw. The depth of the tip of the needle and/or bur may be dynamically tracked and presented. The depth may be presented while the long axis of the needle and/or bur is aligned with the angle and/or location of the target virtual vector, indicating that injection and/or drilling is occurring at the correct location.

At 212B, the GUI may be dynamically updated based on one or more features described with reference to 202B-210B.

The GUI may be dynamically updated by dynamically adapting the virtual location and/or the virtual angle of the current virtual vector overlaid on the frame, which may simultaneously present the target virtual vector.

The GUI may be presented within an augmented reality device worn by the user, optionally the dentist.

The GUI may be updated according to the pose of the head of the user wearing the augmented reality device and/or according to the pose of the head of the subject undergoing the dental procedure, according to the registration between the frame and the dental 3D imaging model, and/or according to the pose of the camera within the coordinate system. For example, the target virtual vector fixed with respect to a certain gap between existing teeth is dynamically updated as the user changes the pose of their head, and/or as the subject changes the pose of their head, relative to the camera capturing the frames.

The GUI may include one or more dental-related anatomical structures of the subject, which may include structures to avoid during injection and/or drilling, and/or may include structures indicating injection sites and/or structures being drilled into. For example, a jawbone, nerves, teeth roots, and foramen(s). The dental-related anatomical structures may be obtained by segmentation of the dental-related anatomical structure from a dental 3D imaging model registered to the frame. The dental 3D imaging model may be created from a 3D image, for example, a CT scan and/or MRI scan. A fused frame including the segmented dental-related anatomical structure fused with the frame may be created. The current virtual vector and/or target virtual vector and/or indication(s) of misalignment may be presented within the GUI as overlays over the fused frame. Additional exemplary details of creating fused frames are described, for example, with reference to International Patent Application Publication No. WO2022/190105, entitled "ENHANCING DENTAL VIDEO TO CT MODEL REGISTRATION AND AUGMENTED REALITY AIDED DENTAL TREATMENT", filed on Mar. 10, 2022.

At 214B, a stage during the procedure for injection and/or for insertion of the dental implant may be detected.

Examples stages for injection of the anesthetic agent include: prior to the needle being located at the target location for injection, needle located at the target location for injection, start of injection, active injection, manipulation of syringe location during injection, termination of injection, and removal of the needle.

Example stages for insertion of the dental implant include: prior to the drill being located at the target location for drilling, drill located at the target location for drilling, start of drill, drilling stage, active drilling, termination of active drilling, and implant placement.

The stage may be automatically detected, for example, based on an analysis of the misalignment and/or location of the current virtual vector. For example:

- A misalignment in terms of displacement in space along the x-axis and/or y-axis indicates the stage prior to injection and/or drilling.
- Alignment of the current vector with the target vector may indicate the start of injection and/or drilling.
- A change in depth while maintaining alignment with respect to the angle and/or location along the x-axis and/or y-axis may indicate the injection and/or drilling stage.
- Absence of the drill and detection of the implant (e.g., being maneuvered by the use) indicates implant placement.

Alternatively, the stage may be manually set, such as by a user speaking into a microphone associated with voice recognition software, and/or pressing an icon on a display, and the like.

A presentation protocol of the GUI indicating features for presentation within the GUI may be set according to the stage. The presentation protocol may be defined for different users, for example, based on personal preferences. For example:

- In response to detecting drilling by the drill and/or detecting injection by the syringe, terminating the presentation of the target virtual vector (e.g., overlay) and of the current virtual vector, which may enable the user to more clearly visualize the drill and/or syringe without obstruction by the overlays.
- In response to detecting termination of injection by the syringe and/or drilling by the drill. The target virtual vector and the current virtual vector may be re-presented, which may assist the user in checking alignment without risking damage to tissue (e.g., since the bur is not spinning and/or the needle is not being moved around).
- When the syringe and/or drill is not located at the target location, an indication of misalignment may be presented. The misalignment may include an indication of misalignment in space along the x-axis and/or y-axis, and optionally the z-axis, and/or the angle misalignment, which may assist the user in maneuvering the syringe and/or drill to the target location. Depth may be excluded from the presentation, since depth is not relevant until injection and/or drilling has begun.
- During injection and/or drilling and/or during implant placement, the depth of the current virtual vector which may correspond to the tip of the needle and/or bur, may be presented. The angle, and/or misalignment in terms of the angle, may also be presented simultaneously with the depth. Other information, such as coordinates in space may be omitted. The angle may be used for maintaining alignment during injection and/or drilling. The depth may be used to determine when to stop the injection and/or drilling. The location in space may be irrelevant during injection and/or drilling, since the syringe and/or drill is at the correct location.
- In response to detecting implant placement, the monitoring may switch from the drill to the implant. The current virtual vector may correspond to the implant, switching from the drill.
- During implant placement, the depth of the implant may be tracked and presented (since the drill is no longer being used). The depth of the implant may be presented relative to the surface of the jawbone, to help the user determine whether the implant is being placed at the correct depth.

At 216B, one of more features described with reference to 202B-214B may be iterated. Each iteration may be performed for one frame of the sequence of frames.

It is to be understood that reference to a drill made with respect to FIGS. 11-15 is exemplary and not necessarily limiting, for example, the target virtual vector indicating a target location and/or target angle for insertion of a needle of a dental syringe may be substituted for the drill described with reference to FIGS. 11-15. In such embodiments, the location and/or angle of the dental syringe is not necessarily tracked. Alternatively, the location of the needle of the dental syringe may be substituted for the drill, for example, where the location and/or angle of the dental syringe is tracked for providing assistance for aligning the needle with the target virtual vector (as described herein).

Referring now back to FIG. 11, GUI 1102 includes target virtual vector 1104 overlaid on frame 1106 depicting an oral cavity of a subject. Target virtual vector 1104 may include a line 1108 and two or more concentric circles 1110. Line 1108 may pass through a center of concentric circles 1110. Line 1108 may be a normal to a plane along which concentric circles 1110 lie. A 3D model of a dental implant 1112 may be presented within GUI 1102, positioned according to target virtual vector 1104. A first portion 1108A of line 1108 external to dental implant 1112 may be shown as continuous. A second portion 1108B of line 1108 internal and below dental implant 1112 may be shown as dotted/dashed.

Referring now back to FIG. 12, GUI 1202 presents target virtual vector 1204 and current virtual vector 1220 overlaid on frame 1206 depicting an oral cavity of a subject. A location and/or angle of current virtual vector 1220 corresponds to a real-world location and/or real-world angle of a bur of a drill 1252 being manipulated by a user. Drill 1252 is to be used for drilling into a jaw of the subject for insertion of the dental implant.

Current virtual vector 1220 may include a line 1208 and two or more concentric circles 1210. Line 1208 may pass through a center of concentric circles 1210. Line 1208 may be a normal to a plane along which concentric circles 1210 lie. A first portion 1208A of line 1208 above the plane of concentric circles 1210, optionally above the surface of tissues, may be shown as continuous. A second portion 1208B of line 1208 below the plane of concentric circles 1210, optionally below the surface of tissues, may be shown as dotted/dashed.

GUI 1202 may further present one or more indications of a misalignment between target virtual vector 1204 and current virtual vector 1220. The indication of misalignment may be visually presented as a line 1250 connecting target virtual vector 1204 and current virtual vector 1202, optionally connecting the center of concentric circles. Line 1250 may represent a vector indicating to the user to where to maneuver the tip of the bur of drill 1252.

GUI 1202 may further present numerical values 1260 indicating displacement in space, along x and y (optionally z) axes defining a coordinate system and/or an angle, of the misalignment between target virtual vector 1204 and current virtual vector 1220. As shown, the tip of the bur is displaced from the target location for drilling defined by the target vector, +94.5 along the x-axis, +11.0 along the y axes, and an angle of +14.2. Components (e.g., along an axes and/or the angle) that are misaligned may be color coded accordingly, for example, in red.

Referring now back to FIG. 13, GUI 1302 depicts the alignment between target virtual vector 1304 and current virtual vector 1320 overlaid on frame 1306 depicting an oral cavity of a subject. Alignment is indicated by the substantial overlap between target virtual vector 1304 and current virtual vector 1320.

Alignment may be further indicated by numerical values 1360 that are close to zero. Numerical values 1360 indicate displacement in space, along x and y (optionally z) axes defining a coordinate system and/or an angle, of the misalignment between target virtual vector 1304 and current virtual vector 1320. The alignment indicates that a bur of a drill 1352 is correctly positioned for drilling. Components (e.g., along an axes and/or the angle) that are aligned may be color coded accordingly, for example, in green.

GUI 1302 may present one or more dental-related anatomical structures, which may be obtained from a segmentation of the dental-related anatomical structure(s) of the subject segmented from a dental 3D imaging model registered to the frame (e.g., CT scan, MRI scan). In the depicted example, the dental-related anatomical structure includes nerves 1370A-B, which are to be avoided during drilling.

Referring now back to FIG. 14, GUI 1402 depicts the small misalignment between target virtual vector 1404 and current virtual vector 1420 overlaid on frame 1406 depicting an oral cavity of a subject. The small misalignment is presented within numerical values 1460 as a misalignment of the angle of +5.5. A marker 1470, presented along a circle of concentric circles 1410 of the virtual vector and/or the current vector, indicating the direction and/or magnitude of the manipulation of a drill 1452 to be performed by the user.

Referring now back to FIG. 15, GUI 1502 depicts the small misalignment between target virtual vector 1504 and current virtual vector 1520 overlaid on frame 1506 depicting an oral cavity of a subject. The small misalignment is presented within numerical values 1560 as a misalignment along the y-axis of −2.4. A marker 1570, presented along a circle of concentric circles 1510 of the virtual vector and/or the current vector, indicating the direction and/or magnitude of the manipulation of a drill 1552 to be performed by the user.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant GUIs will be developed and the scope of the term GUI is intended to include all such new technologies a priori.

As used herein the term "about" refers to +10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween. It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method for processing data using at least one processor coupled to a memory, the method comprising:
   displaying via a display device of a client computing device, an interactive graphical user interface (GUI) for planning positioning of a dental syringe in a subject:
   presenting, within the GUI, sequential frames of an oral cavity of a subject captured by at least one image sensor during a dental session of the subject;
   computing a real-world location and/or angle of a real-world dental syringe manipulated by a user; and dynamically updating, within the GUI, an overlay of a virtual angle and/or virtual location of a virtual vector overlaid on the sequential frames corresponding to the real-world location and/or angle of the real-world dental syringe, wherein the virtual vector denotes a location and angle for injection of an anesthetic agent by a needle of the dental syringe.

2. The computer-implemented method of claim 1, further comprising:

detecting and/or segmenting at least one dental-related anatomical structure of the subject from a dental 3D imaging model, wherein the at least one dental-related anatomical structure includes at least one target for injection of anesthesia by the dental syringe;

presenting within the GUI, at least one fused frame depicting a merger of the sequential frames and the segmentation of the at least one dental-related anatomical structure of the subject registered to the sequential frames, wherein the at least one dental-related anatomical structure is depicted on the sequential frames at a location indicating the at least one target for injection; and dynamically updating the location of the at least one dental-related anatomical structure depicted in the at least one fused frame according to dynamic adaptation of a pose of the at least one image sensor.

3. The computer-implemented method of claim 2, further comprising presenting within the GUI, an overlay comprising a target virtual vector positioned at the location indicating a target angle for placement of the needle for injection of an anesthetic agent at the at least one dental-related anatomical structure.

4. The computer-implemented method of claim 3, wherein the target angle is computed from the dental 3D imaging model by feeding at least a portion of the dental 3D imaging model into a machine learning model trained on a plurality of sample dental 3D imaging models of a plurality of sample patients, each sample dental 3D imaging model labelled with a ground truth label of the target angle positioned at the location corresponding to the at least one dental-related anatomical structure.

5. The computer-implemented method of claim 2, wherein the target virtual vector is fixed with respect to the location of the at least one dental-related anatomical structure and depicted in the at least one fused frame during the dynamic adaptation of the pose of the at least one image sensor.

6. The computer-implemented method of claim 2, wherein the at least one dental-related anatomical structure is selected from: mental foramen and mandibular foramen.

7. The computer-implemented method of claim 2, further comprising dynamically updating within the GUI, the virtual vector depicted at least partially within the segmentation of the at least one dental-related anatomical structure according to manipulations of the dental syringe by the user.

8. The computer-implemented method of claim 2, wherein the at least one dental-related anatomical structure comprises a plurality of different dental-related anatomical structures selected from: roots of teeth, jawbone, at least one nerve, and at least one foramen, wherein the plurality of different dental-related anatomical structures are simultaneously presented within the GUI.

9. The computer-implemented method of claim 1, further comprising dynamically generating and presenting within the GUI, a second overlay over the sequential frames of a virtual angle and/or virtual location of a visual indication of a predicted region of anesthetized tissue, according to an injection of anesthesia at a corresponding physical angle and/or physical location of the dental syringe manipulated by the user.

10. The computer-implemented method of claim 3, further comprising presenting within the GUI, a dental 3D visual model of the subject created based on a visible light spectrum intraoral scan of the subject, the dental 3D visual model presented as a second overlay on the sequential frames according to a registration between the dental 3D visual model, the dental 3D imaging model, and the sequential frames, wherein the target virtual vector is overlaid on the dental 3D visual model and the sequential frames and placed at the location denoting the at least one dental-related anatomical structured at the target angle for placement of the needle for injection of the anesthetic agent, wherein the dental 3D visual model is created by an intraoral scanner capturing images at the visual light spectrum.

11. A computer-implemented method for processing data using at least one processor coupled to a memory, the method comprising:

displaying via a display unit of a client computing device, an interactive graphical user interface (GUI) for guiding positioning of a dental syringe in a subject;

presenting within the GUI, a first overlay of a target virtual vector overlaid on at least one image of an oral cavity of a subject captured by at least one image sensor during a dental session of the subject, wherein the target virtual vector denotes a target virtual vector defining a target location and a target angle for injection of an anesthetic agent by a real-world needle of a real-world syringe;

monitoring a real-world location and angle of the real-world needle of the dental syringe during manipulations by a user; and dynamically updating, within the GUI, a second overlay of a current virtual vector overlaid on the at least one image including the first overlay, the current virtual vector including a virtual location and virtual angle corresponding to a current value of the monitored real-world location and angle of the real-world needle of the dental syringe, wherein the current virtual vector is presented as a first line parallel to a long axis of the needle and as a plurality of first concentric circles arranged along a first plane, the first line is normal to the first plane, the target virtual vector is presented as a second line parallel to a direction for insertion of the needle and as a plurality of second concentric circles arranged along a second plane, the second line is normal to the second plane, wherein when misaligned the plurality of first concentric circles and the plurality of second concentric circles are distinct and dynamically visually adapted for indicting direction and/or amount and/or angle for alignment, and when aligned are depicted as a single set of concentric circles.

12. The computer-implemented method of claim 11, wherein the target location is selected from: mental foramen and mandibular foramen.

13. The computer-implemented method of claim 11, further comprising dynamically tracking a misalignment between the current virtual vector and the target virtual vector, and presenting within the GUI, an indication of the misalignment, wherein the indication for reducing the misalignment is for adapting at least one of: spatial coordinates of the current virtual vector to match the spatial coordinates of the target virtual vector, the angle of the current virtual vector to substantially match the angle of the target virtual vector, and a depth of the current virtual vector corresponding to a tip of the dental syringe relative to an initial location for injection defined by the target virtual vector.

14. The computer-implemented method of claim 11, wherein a center of the plurality of first concentric circles and a center of the first line correspond to a tip of the needle, wherein a center of the plurality of second concentric circles corresponds to an initial location for injection, wherein a center of the second line corresponds to the initial location for injection, wherein a first portion of the second line below the center is depicted within tissue and a second portion of the second line above the center is depicted external to the tissue.

15. A computer implemented method for processing data using at least one processor coupled to a memory, the method comprising:
    detecting and/or segmenting at least one dental-related anatomical structure of the subject from a dental 3D imaging model, wherein the at least one dental-related anatomical structure includes at least one target for injection of anesthesia by a dental syringe;
    displaying via a display device of a client computing device, an interactive graphical user interface (GUI) for planning positioning of a dental syringe in a subject:
    accessing sequential frames of an oral cavity of a subject captured by at least one image sensor during a dental session of the subject;
    presenting within the GUI, at least one fused frame depicting a merger of the sequential frames and the segmentation of the at least one dental-related anatomical structure of the subject registered to the sequential frames,
    wherein the at least one dental-related anatomical structure is depicted on the sequential frames at a location indicating the at least one target for injection; and
    dynamically updating the location of the at least one dental-related anatomical structure depicted on the sequential frames according to dynamic adaptation of a pose of the at least one image sensor.

16. The computer implemented method of claim 15, wherein the location of the at least one dental-related anatomical structure is dynamically updated independently of a pose of the dental syringe.

17. The computer implemented method of claim 15, further comprising presenting within the GUI, an overlay comprising a target virtual vector positioned at the location indicating a target angle for placement of a needle of the dental syringe for injection of an anesthetic agent at the at least one dental-related anatomical structure.

18. The computer-implemented method of claim 17, wherein the target angle is computed from the dental 3D imaging model by feeding at least a portion of the dental 3D imaging model into a machine learning model trained on a plurality of sample dental 3D imaging models of a plurality of sample patients, each sample dental 3D imaging model labelled with a ground truth label of the target angle positioned at the location corresponding to the at least one dental-related anatomical structure.

19. The computer-implemented method of claim 17, wherein the target virtual vector is fixed with respect to the location of the at least one dental-related anatomical structure and depicted in the at least one fused frame during the dynamic adaptation of the pose of the at least one image sensor.

20. The computer-implemented method of claim 17, wherein the target virtual vector is adaptable via a user interface, and fixed at the target angle in response to a user input entered via the user interface.

21. The computer-implemented method of claim 17, wherein the target virtual vector is presented as a line parallel to a direction for insertion of the needle and as a plurality of concentric circles arranged along a plane tangent to a surface of the location of the at least one dental-related anatomical structure, wherein the line is normal to the plane.

22. The computer-implemented method of claim 15, wherein the at least one dental-related anatomical structure is selected from: mental foramen and mandibular foramen.

\* \* \* \* \*